(12) United States Patent
Green et al.

(10) Patent No.: US 11,608,097 B2
(45) Date of Patent: Mar. 21, 2023

(54) GUIDEWAY MOUNTED VEHICLE LOCALIZATION SYSTEM

(71) Applicant: Thales Canada Inc., Toronto (CA)

(72) Inventors: Alon Green, Toronto (CA); Walter Kinio, Toronto (CA); Peter Timmermans, Toronto (CA)

(73) Assignee: THALES CANADA INC, Toronto (CA)

( * ) Notice: Subject to any disclaimer, the term of this patent is extended or adjusted under 35 U.S.C. 154(b) by 742 days.

(21) Appl. No.: 16/489,337

(22) PCT Filed: Feb. 28, 2018

(86) PCT No.: PCT/IB2018/051295
§ 371 (c)(1),
(2) Date: Aug. 27, 2019

(87) PCT Pub. No.: WO2018/158712
PCT Pub. Date: Sep. 7, 2018

(65) Prior Publication Data
US 2020/0070859 A1 Mar. 5, 2020

Related U.S. Application Data

(60) Provisional application No. 62/464,729, filed on Feb. 28, 2017.

(51) Int. Cl.
*B61L 25/02* (2006.01)
*G01P 3/68* (2006.01)
(Continued)

(52) U.S. Cl.
CPC .......... *B61L 25/025* (2013.01); *B61L 25/021* (2013.01); *G01P 3/68* (2013.01); *G01S 13/60* (2013.01);
(Continued)

(58) Field of Classification Search
CPC ........ B61L 25/025; B61L 25/021; G01P 3/68; G01S 13/60; G01S 17/42; G01S 17/58; G01S 17/87
See application file for complete search history.

(56) References Cited

U.S. PATENT DOCUMENTS 7,707,944 B2   5/2010   Bounds
7,729,818 B2   6/2010   Wheeler et al.
(Continued)

FOREIGN PATENT DOCUMENTS

EP   1600351 A1   11/2005
WO   2016118672 A2   7/2016
(Continued)

OTHER PUBLICATIONS

European Search Report issued in corresponding European Patent Application No. 18761058, dated Jan. 21, 2020, pp. 1-8, European Patent Office, Munich, Germany.
(Continued)

*Primary Examiner* — Luke D Ratcliffe
(74) *Attorney, Agent, or Firm* — Hauptman Ham, LLP

(57) ABSTRACT

A system comprises a set of sensors on a first end of a vehicle having the first end and a second end, and a controller. The sensors are configured to generate corresponding sensor data based on a detected object along a direction of movement of the vehicle. The controller is configured to compare a time at which the first sensor detected the object with a time at which the second sensor detected the object to identify the first end or the second end as a leading end of the vehicle, and to calculate a position of the leading end of the vehicle based on the sensor data generated by one or more of the first sensor or the second sensor. The controller is also configured to generate a map of the plurality of objects based on the sensor data.

20 Claims, 9 Drawing Sheets

(51) Int. Cl.
    *G01S 13/60*     (2006.01)
    *G01S 17/42*     (2006.01)
    *G01S 17/58*     (2006.01)
    *G01S 17/87*     (2020.01)

(52) U.S. Cl.
    CPC .............. *G01S 17/42* (2013.01); *G01S 17/58* (2013.01); *G01S 17/87* (2013.01)

(56) References Cited

U.S. PATENT DOCUMENTS

| | | | |
|---|---|---|---|
| 8,483,895 B1 | 7/2013 | Beregi | |
| 9,221,481 B2 | 12/2015 | Desbordes et al. | |
| 9,292,017 B2 | 3/2016 | Preston et al. | |
| 9,434,397 B2 | 9/2016 | Chung et al. | |
| 2008/0201028 A1* | 8/2008 | Brooks | B61L 3/006 701/20 |
| 2014/0297069 A1* | 10/2014 | Landes | E01B 35/00 701/19 |
| 2015/0239482 A1* | 8/2015 | Green | B61L 15/0063 246/122 R |
| 2015/0331111 A1 | 11/2015 | Newman et al. | |
| 2016/0121912 A1 | 5/2016 | Puttagunta et al. | |
| 2017/0043797 A1* | 2/2017 | Allshouse | B61L 25/025 |
| 2017/0307751 A1 | 10/2017 | Rohani et al. | |

FOREIGN PATENT DOCUMENTS

| | | |
|---|---|---|
| WO | 2016162568 A1 | 10/2016 |
| WO | 2017033150 A1 | 3/2017 |

OTHER PUBLICATIONS

Jabbour, M. et al., "Backing up GPS in Urban Areas using a Scanning Laser," IHeudiasyc UMR CNRS 6599, Universite de Technologie de Compiègne, France, pp. 1-6. Retrieved from the Internet at: https://www.researchgate.net/profile/Philippe_Bonnifait/publication/4350665_Backing_up_GPS_in_urban_areas_using_a_scanning_laser/links/0deec52178349da0c7000000/Backing-up-GPS-in-urbanareas-using-a-scanning-laser.pdf.

Marlow, S.Q., "Local Terrain Mapping for Obstacle Avoidance Using Monocular Vision," Master Thesis presented to The Pennsylvania State University. Retrieved from the Internet at: https://etda.libraries.psu.edu/files/final_submissions/5747, pp. 1-70.

Parent, M. et al., "Obstacle detection and avoidance," pp. 1-34. Retrieved from the Internet at: http://www.citymobil-project.eu/downloadables/Deliverables/D3.3.1-PU-Obstacle_detection_&_avoidance-CityMobl.pdf.

Wei, C. et al., "Estimation of Initial Position Using Line Segment Matching in Maps," International Journal of Advanced Robotic Systems, Sage Publications Ltd. (2016), pp. 1-2.

International Search Report from corresponding International Application No. PCT/IB2018/051295, dated May 7, 2018, pp. 1-3, Canadian Intellectual Property Office, Gatineau, Quebec, Canada.

\* cited by examiner

GUIDEWAY MOUNTED VEHICLE LOCALIZATION SYSTEM

BACKGROUND

Guideway mounted vehicles often include communication train-based control (CTBC) systems to receive movement instructions from wayside mounted devices adjacent to a guideway. The CTBC systems are used to determine a location and a speed of the guideway mounted vehicle. The CTBC systems determine the location and speed by interrogating transponders positioned along the guideway. The CTBC systems report the determined location and speed to a centralized control system or to a de-centralized control system through the wayside mounted devices.

The centralized or de-centralized control system stores the location and speed information for guideway mounted vehicles within a control zone. Based on this stored location and speed information, the centralized or de-centralized control system generates movement instructions for the guideway mounted vehicles.

When communication between the guideway mounted vehicle and the centralized or de-centralized control system is interrupted, the guideway mounted vehicle is braked to a stop to await a manual driver to control the guideway mounted vehicle. Communication interruption occurs not only when a communication system ceases to function, but also when the communication system transmits incorrect information or when the CTBC rejects an instruction due to incorrect sequencing or corruption of the instruction.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion.

DETAILED DESCRIPTION

The following disclosure provides many different embodiments, or examples, for implementing different features of the invention. Specific examples of components and arrangements are described below to simplify the present disclosure. These are examples and are not intended to be limiting.

Figure 1:
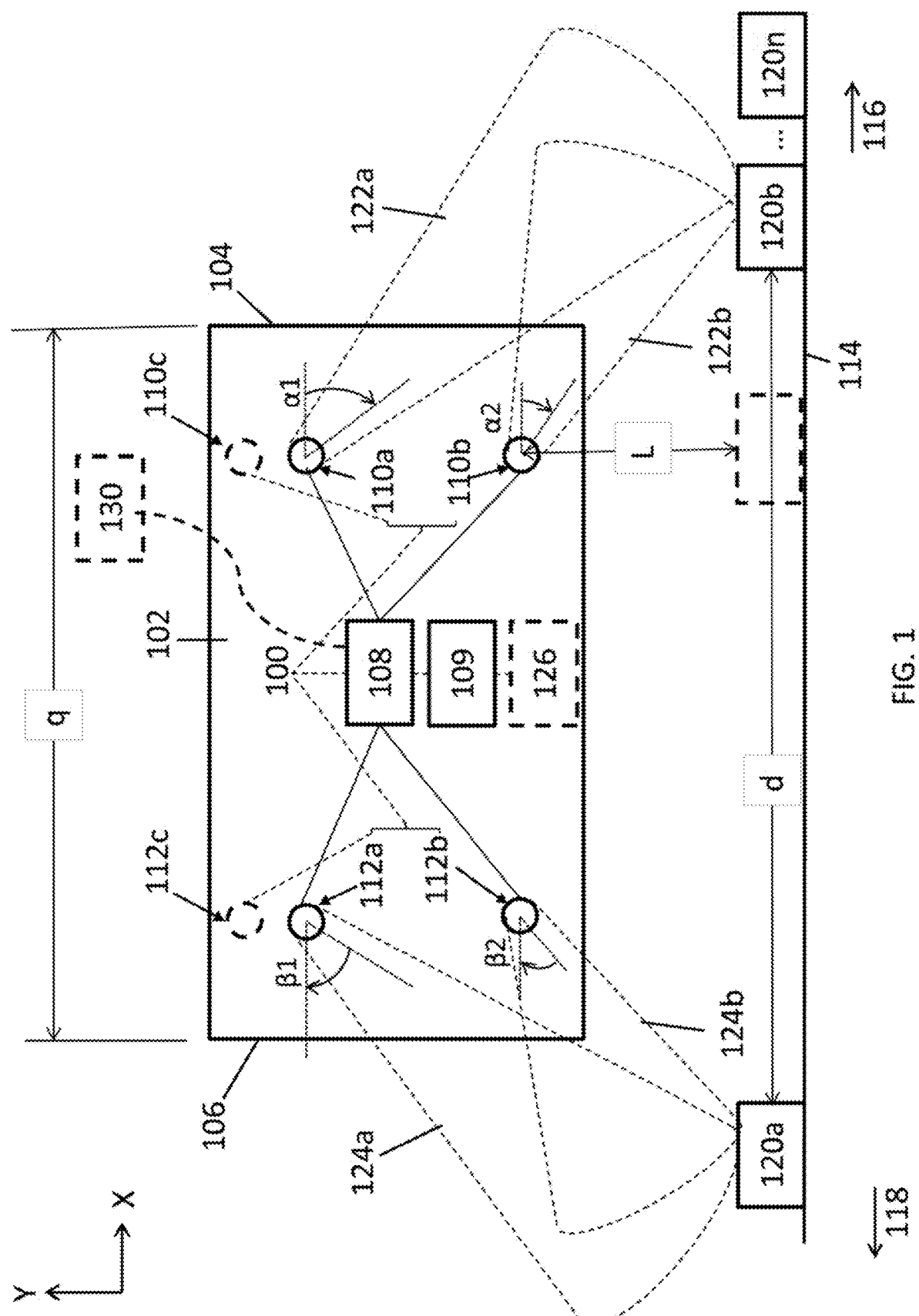
FIG. 1 is a diagram of a vehicle localization system, in accordance with one or more embodiments.

FIG. 1 is a diagram of a vehicle localization system 100, in accordance with one or more embodiments. Vehicle localization system 100 is associated with a vehicle 102 having a first end 104 and a second end 106. Vehicle localization system 100 comprises a controller 108, a memory 109, a first set of sensors including a first sensor 110a, a second sensor 110b (collectively referred to herein as the "first set of sensors 110") on the first end 104 of the vehicle 102, and a second set of sensors including a third sensor 112a and a fourth sensor 112b (collectively referred to herein as the "second set of sensors 112") on the second end 106 of the vehicle. In some embodiments, the first set of sensors 110 optionally includes a first auxiliary sensor 110c. In some embodiments, the second set of sensors 112 optionally includes a second auxiliary sensor 112c. In some embodiments, though described as a set of sensors, one or more of the first set of sensors 110 or the second set of sensors 112 includes only one sensor. In some embodiments, though described as a set of sensors, one or more of the first end includes one of first sensor 110a or second sensor 110b, or the second end includes one of third sensor 112a or fourth sensor 112b.

The controller 108 is communicatively coupled with the memory 109, the sensors of the first set of sensors 110 and with the sensors of the second set of sensors 112. In some embodiments, the controller 108 is communicatively coupled with the memory 109 and one or more of first sensor 110a, second sensor 110b, third sensor 112a or fourth sensor 112b. The controller 108 is on-board the vehicle 102. If on-board, the controller 108 is a vehicle on-board controller ("VOBC"). In some embodiments, one or more of the controller 108 or the memory 109 is off-board the vehicle 102. In some embodiments, the controller 108 comprises one or more of the memory 109 and a processor (e.g., processor 902 (shown in FIG. 9)).

Vehicle 102 is configured to move along a guideway 114 in one of a first direction 116 or a second direction 118. In some embodiments, guideway 114 includes two spaced rails. In some embodiments, guideway 114 includes a monorail. In some embodiments, guideway 114 is along a ground. In some embodiments, guideway 114 is elevated above the ground. Based on which direction the vehicle 102 moves along the guideway 114, one of the first end 104 is a leading end of the vehicle 102 or the second end 106 is the leading end of the vehicle 102. The leading end of the vehicle 102 is the end of the vehicle 102 that corresponds to the direction of movement of the vehicle 102 along the guideway 114. For example, if the vehicle 102 moves in the first direction 116, then the first end 104 is the leading end of the vehicle 102. If the vehicle 102 moves in the second direction 118, then the second end 106 is the leading end of the vehicle 102. In some embodiments, the vehicle 102 is capable of being rotated with respect to the guideway 114 such that the first end 104 is the leading end of the vehicle 102 if the vehicle 102 moves in the second direction 118, and the second end 106 is the leading end of the vehicle 102 if the vehicle 102 moves in the first direction 116.

As the vehicle 102 moves in the first direction 116 or in the second direction 118 along the guideway 114, the sensors of the first set of sensors 110 and the sensors of the second set of sensors 112 are each configured to detect one or more objects 120a-120n, where n is a positive integer greater than 1. The objects 120a-120n are collectively referred to herein as "object(s) 120." The sensors of the first set of sensors 110 and the sensor of the second set of sensors 112 are each configured to generate corresponding sensor data based on a detected object 120.

In some embodiments, one or more of the objects 120 are on the guideway 114. In some embodiments, one or more of the objects 120 are on a wayside of the guideway 114. In some embodiments, all of the objects 120 are on the guideway. In some embodiments, all of the objects 120 are on the wayside of the guideway.

An object 120 is, for example, a static object such as a sign, a shape, a pattern of objects, a signal, a switch, a transponder, communication equipment, construction elements, a tunnel, a wall, a platform, a building, a boulder, a tree, a landmark, a distinct or sharp change in one or more guideway properties (e.g. direction, curvature, or other identifiable property), which can be accurately associated with a specific location, or some other suitable detectable feature or object usable to determine a geographic location of a vehicle. In some embodiments, the objects 120 comprise one or more of rails installed on the guideway 114, sleepers or ties installed on the guideway 114, rail baseplates installed on the guideway 114, garbage catchers installed on the guideway 114, boxes containing signaling equipment installed on the guideway 114, fence posts installed on the wayside of the guideway 114, signs installed on the wayside of the guideway 114, other suitable objects associated with being on the guideway 114 or on the wayside of the guideway 114. In some embodiments, at least some of the objects 120 comprise one or more different objects or patterns of objects compared to other objects 120. For example, if one object 120 comprises a garbage catcher, a different object 120 comprises a railroad tie.

Consecutive objects 120 are spaced apart by a distance d. In some embodiments, the distance d between consecutive objects 120 is substantially equal between all of the objects 120. In some embodiments, the distance d between consecutive objects 120 is different between a first pair of objects 120 and a second pair of objects 120. In some embodiments, the objects 120 are randomly positioned along or with respect to the guideway 114, or with respect to other objects 120.

Each of the sensors of the first set of sensors 110 and the sensors of the second set of sensors 112 is positioned on the first end 104 of the vehicle 102 or the second end of the vehicle 102 at a corresponding distance L from the objects 120. The distance L is measured in a direction perpendicular to the direction of movement of the vehicle 102, between each sensor of the first set of sensors 110 and each sensor of the second set of sensors 112 as the vehicle 102 moves past a same object 120. For example, if the vehicle 102 is moving in the first direction 116, the first sensor 110a is positioned a distance L1 from object 120a, and second sensor 110b is positioned a distance L2 from object 120a. Similarly, as the vehicle 102 passes object 120a, third sensor 112a is a distance L3 from object 120a, and fourth sensor 112b is a distance L4 from object 120a. The corresponding distances L1, L2, L3 and L4 are not shown in FIG. 1 to avoid obscuring the drawing.

The first sensor 110a has a first inclination angle $\alpha 1$ with respect to the detected object 120. The second sensor 110b has a second inclination angle $\alpha 2$ with respect to the detected object 120 different from the first inclination angle $\alpha 1$. The third sensor 112a has a third inclination angle $\beta 1$ with respect to the detected object 120. The fourth sensor 112b has a fourth inclination angle $\beta 2$ with respect to the detected object 120 of different from the fourth inclination angle $\beta 1$. In some embodiments, the discussed inclination angles $\alpha 1$, $\alpha 2$, $\beta 1$ and $\beta 2$ are measured with respect to a corresponding horizon line that is parallel to the guideway 114. The corresponding horizon line for each sensor of the first set of sensors 110 and each sensor of the second set of sensors 112 is separated from the object 120 by the corresponding distance L of each sensor of the first set of sensors 110 or each sensor of the second set of sensors 112. In some embodiments, inclination angle $\alpha 1$ is substantially equal to inclination angle $\beta 1$, and inclination angle $\alpha 2$ is substantially equal to inclination angle $\beta 2$.

In some embodiments, one or more of the sensors of the first set of sensors 110 or one or more of the sensors of the second set of sensors 112 is fixed. If the objects 120 are on the guideway, then the sensors of the first set of sensors 110 and the sensors of the second set of sensors 112 are directed toward the guideway 114. In some embodiments, if the vehicle 102 is configured to move over the guideway 114, and the objects 120 are on the guideway, then the sensors of the first set of sensors 110 and the sensors of the second set of sensors 112 are directed downward toward the guideway 114. If the objects 120 are along the guideway 114 on the wayside of the guideway 114, then the sensors of the first set of sensors 110 and the sensors of the second set of sensors 112 are directed toward the wayside of the guideway 114. In some embodiments, one or more of the sensors of the first set of sensors 110 or one or more of the sensors of the second set of sensors 112 is configured to be movable so as to rotate in at least one plane to facilitate a two-dimensional scanning (2D) in the at least one plane. In some embodiments, one or more of the sensors of the first set of sensors 110 or one or more of the sensors of the second set of sensors 112 is configured to be movable so as to rotate in at least two planes to facilitate a three-dimensional (3D) scanning. In some embodiments, one or more of the sensors of the first set of sensors 110 or one or more of the sensors of the second set of sensors 112 is configured to perform a 2D scanning in at least one plane. In some embodiments, one or more of the sensors of the first set of sensors 110 or one or more of the sensors of the second set of sensors 112 is configured to perform a 3D scanning.

In some embodiments, the sensors of the first set of sensors 110 and the sensors of the second set of sensors 112 make it possible for the controller 108 to determine the location of the vehicle 102 to high accuracy of about +/−5 cm or about +/−15 cm based on a detection of at least one object 120. In some embodiments, the one or more of the sensors of the first set of sensors 110 or one or more of the sensors of the second set of sensors perform a 2D scan by scanning back and forth within the same plane. In some embodiments, the one or more of the sensors of the first set of sensors 110 or one or more of the sensors of the second set of sensors perform a 3D scan by scanning from left to right or right to left within a certain plane, then scanning from left to right or right to left within a lower/higher plane, then repeating the same scanning procedure until the lowest/ highest plane is reached and then repeating the scanning multiple times. In some embodiments, the one or more of the sensors of the first set of sensors 110 or one or more of the sensors of the second set of sensors perform a 3D scan by scanning from a first side of a field of view of the sensor to a second side of the field of view of the sensor within a certain plane, then scanning from the first side of the field of view to the second side of the field of view, or from the second side of the field of view to the first side of the field of view within a parallel plane, then repeating the same scanning procedure until the scanning is performed in at least two parallel planes. In some embodiments, the one or more of the sensors of the first set of sensors 110 or one or more of the sensors of the second set of sensors perform a 3D scan by scanning from a first side of a field of view of the sensor to a second side of the field of view of the sensor within a certain plane, then scanning from a first side of the field of view to a second side of the field of view in some other plane within which the sensor is capable of performing a scan.

Each of the sensors of the first set of sensors 110 and the sensors of the second set of sensors 112 has a corresponding field of view. Sensor 110a has a field of view 122a that is based on the position of sensor 110a on the first end 104 of the vehicle 102 and inclination angle α1. Sensor 110b has a field of view 122b that is based on the position of sensor 110b on the first end 104 of the vehicle 102 and inclination angle α2. Sensor 112a has a field of view 124a that is based on the position of sensor 112a on the second end 106 of the vehicle 102 and inclination angle β1. Sensor 112b has a field of view 124b that is based on the position of sensor 112b on the second end 106 of the vehicle 102 and inclination angle β2. In some embodiments, one or more of the sensors of the first set of sensors 110 or one or more of the sensors of the second set of sensors 112 is configured to be movable to expand the field of view.

Field of view 122a overlaps with field of view 122b, and field of view 124a overlaps with field of view 124b. In some embodiments, one or more of field of view 122a and field of view 122b are non-overlapping, or field of view 124a and field of view 124b are non-overlapping. The position and inclination angle of each sensor 110 of the first set of sensors 110 is such that a detected object 120 enters one of the field of view 122a or 122b, first, based on the direction the vehicle 102 moves along the guideway 114. Similarly, the position and inclination angle of each sensor 112 of the second set of sensors 112 is such that a detected object 120 enters one of the field of view 124a or 124b, first, based on the direction the vehicle 102 moves along the guideway 114. In some embodiments, the objects 120 are spaced along the guideway 114 such that only one of the objects 120 is within field of view 122a or 122b at a time. Similarly, in some embodiments, the objects 120 are spaced along the guideway 114 such that only one of the objects 120 is within field of view 124a or 124b at a time. In some embodiments, the objects 120 are spaced along the guideway 114 such that only one of the objects 120 is within field of view 122a, 122b, 124a or 124b at a time. In some embodiments, objects 120 are spaced along the guideway 114 such that only one object 120 is detected by the sensors of the first set of sensors 110 or the sensors of the second set of sensors 112 at a time. That is, in some embodiments, an object 120 is within field of view 122a and 122b, or within field of view 124a and 124b.

In some embodiments, the objects 120 are separated by a distance d that results in there being non-detection time between consecutive object 120 detections as the vehicle 102 moves along the guideway 114. For example, if the objects 120 are separated by a distance d that results in there being a non-detection time to a detection time ratio that is at least about 0.40. In some embodiments, the ratio of non-detection time to detection time is at least about 0.50.

In some embodiments, the distance d between consecutive objects 120 is such that a ratio of a detection span I of the sensors (e.g., the first set of sensors 110 and the second set of sensors 112) to the distance d between consecutive objects 120 is less than about 0.50. For example, if the detection span I of a sensor with respect to a surface where the objects 120 reside is based on equation (1), below $$I = L(1/tg(\gamma - \tfrac{1}{2}FOV) - 1/tn(\gamma + \tfrac{1}{2}FOV)) \quad (1)$$

where:
I is the detection span of the sensor,
L is the separation distance between the sensor and the object in a direction perpendicular to the direction of movement of the vehicle,
γ is the inclination angle of the sensor, and
FOV is the field of view of the sensor.

In some embodiments, objects 120 that have a distinct difference between consecutive objects 120 (e.g. a sharp rising edge or a sharp falling edge upon the detection of a next object 120) makes it possible to reduce the distance d between consecutive objects 120 compared to other embodiments in which the objects 120 are separated by a distance d that is greater than about twice the detection span I, or embodiments in which the ratio of non-detection time to detection time being greater than about 0.50, for example.

In some embodiments, the distance d between consecutive objects 120 is set based on one or more of the velocity of the vehicle 102, processing time and delays of the controller 108, field of view 122a, 122b, 124a and/or 124b, the inclination angles α1, α2, β1, and/or β2, the separation distances L1, L2, L3 and/or L4 between the sensors and the objects 120, a resolution of the sensors, a range of the sensors, an environment within which the object 120 is positioned, and/or a width of each object 120 measured in the direction of movement of the vehicle 102.

Sensors of the first set of sensors 110 and sensors of the second set of sensors 112 are one or more of laser imaging detection and ranging ("LIDAR") sensors, radio detection and ranging ("RADAR") sensors, cameras, infrared-based sensors, or other suitable sensors configured to detect an object or pattern of objects such as objects 120. In some embodiments, one or more sensors of the first set of sensors 110 or the sensors of the second set of sensors are configured to measure the distance between the sensor and an object 120 or a plurality of objects 120 in the field of view based on a time-of flight principle to the object or the plurality of objects 120 in the field of view that reflect a signal or light emitted by the sensor back to the sensor.

In some embodiments, one or more sensors of the first set of sensors 110 or one or more of the sensors of the second set of sensors 112 is a sensor having a field of view in a range of about 15° to about 90°. In some embodiments, one or more sensors of the first set of sensors 110 or one or more of the sensors of the second set of sensors 112 is a sensor having a field of view in a range of about 30° to about 90°. In some embodiments, one or more sensors of the first set of sensors 110 or one or more of the sensors of the second set of sensors 112 is a sensor having a field of view in a range of about 45° to about 90°. In some embodiments, one or more sensors of the first set of sensors 110 or one or more of the sensors of the second set of sensors 112 is a sensor having a field of view in a range of about 60° to about 120°.

In some embodiments, one or more sensors of the first set of sensors 110 or one or more of the sensors of the second set of sensors 112 is a sensor having a field of view in a range of about 90° to about 135°. In some embodiments, one or more sensors of the first set of sensors 110 or one or more of the sensors of the second set of sensors 112 is a sensor having a field of view in a range of about 90° to about 180°. In some embodiments, one or more sensors of the first set of sensors 110 or one or more of the sensors of the second set of sensors 112 is a sensor having a field of of 90°. In some embodiments, one or more sensors of the first set of sensors 110 or one or more of the sensors of the second set of sensors 112 is a sensor having a field of view that is some other suitable angle. In some embodiments, one or more sensors of the first set of sensors 110 or one or more of the sensors of the second set of sensors 112 is a sensor having a variable field of view that the controller 108 is configured to cause to change based on a determined vehicle speed along guideway 114. In some embodiments, one or more sensors of the first set of sensors 110 or one or more of the sensors of the second set of sensors 112 is a sensor having a variable field of view that the controller 108 is configured to cause to change based on a determined location of the vehicle 102 along guideway 114.

In some embodiments, one or more sensors of the first set of sensors 110 or one or more of the sensors of the second set of sensors 112 is a sensor having a scanning frequency of about 10 Hz to about 50 Hz. In some embodiments, one or more sensors of the first set of sensors 110 or one or more of the sensors of the second set of sensors 112 is a sensor having a scanning frequency of about 20 Hz to about 50 Hz. In some embodiments, one or more sensors of the first set of sensors 110 or one or more of the sensors of the second set of sensors 112 is a sensor having a scanning frequency of about 50 Hz to about 100 Hz. In some embodiments, one or more sensors of the first set of sensors 110 or one or more of the sensors of the second set of sensors 112 is a sensor having a scanning frequency that is 50 Hz. In some embodiments, one or more sensors of the first set of sensors 110 or one or more of the sensors of the second set of sensors 112 is a sensor having some other suitable scanning frequency that detecting objects 120 possible at a given vehicle speed. In some embodiments, one or more sensors of the first set of sensors 110 or one or more of the sensors of the second set of sensors 112 is a sensor having a variable scanning frequency that the controller 108 is configured to cause to change based on a determined vehicle speed along guideway 114. In some embodiments, one or more sensors of the first set of sensors 110 or one or more of the sensors of the second set of sensors 112 is a sensor having a variable scanning frequency that the controller 108 is configured to cause to change based on a determined location of the vehicle 102 along guideway 114.

In some embodiments, one or more sensors of the first set of sensors 110 or one or more of the sensors of the second set of sensors 112 is a sensor having an angular resolution of 0.1°. In some embodiments, one or more sensors of the first set of sensors 110 or one or more of the sensors of the second set of sensors 112 is a sensor having an angular resolution of 0.05°. In some embodiments, one or more sensors of the first set of sensors 110 or one or more of the sensors of the second set of sensors 112 is a sensor having an angular resolution of 0.01°. In some embodiments, one or more sensors of the first set of sensors 110 or one or more of the sensors of the second set of sensors 112 is a sensor having an angular resolution of 0.5°. In some embodiments, one or more sensors of the first set of sensors 110 or one or more of the second set of sensors 112 is a sensor having an angular resolution of 1°. In some embodiments, one or more sensors of the first set of sensors 110 or one or more of the sensors of the second set of sensors 112 is a sensor having an angular resolution of 0.01°. In some embodiments, one or more sensors of the first set of sensors 110 or one or more of the sensors of the second set of sensors 112 is a sensor having a variable an angular resolution that the controller 108 is configured to cause to change based on a determined vehicle speed along guideway 114. In some embodiments, one or more sensors of the first set of sensors 110 or one or more of the sensors of the second set of sensors 112 is a sensor having a variable an angular resolution that the controller 108 is configured to cause to change based on a determined location of the vehicle 102 along guideway 114.

In some embodiments, one or more sensors of the first set of sensors 110 or one or more of the sensors of the second set of sensors 112 is a sensor having a range of about 5 m to about 300 m. In some embodiments, one or more sensors of the first set of sensors 110 or one or more of the sensors of the second set of sensors 112 is a sensor having a range of about 50 m to about 200 m. In some embodiments, one or more sensors of the first set of sensors 110 or one or more of the sensors of the second set of sensors 112 is a sensor having a range of about 100 m to about 200 m. In some embodiments, one or more sensors of the first set of sensors 110 or one or more of the sensors of the second set of sensors 112 is a sensor having a range of about 150 m. In some embodiments, one or more sensors of the first set of sensors 110 or one or more of the sensors of the second set of sensors 112 is a sensor having a range that the controller 108 is configured to cause to change based on a determined vehicle speed along guideway 114. In some embodiments, one or more sensors of the first set of sensors 110 or one or more of the sensors of the second set of sensors 112 is a sensor having a range that the controller 108 is configured to cause to change based on a determined location of the vehicle 102 along guideway 114.

The controller 108 is configured to determine which of the first end 104 or the second end 106 of the vehicle 102 is the leading end of the vehicle 102 as the vehicle 102 moves along the guideway 114, determine a position of the leading end of the vehicle 102 with respect to a detected object 120, determine a position of the vehicle 102 with respect to a detected object 120, and determine a velocity of the vehicle 102 as the vehicle 102 moves along the guideway 114.

In some embodiments, the controller 108 is configured to use one or more of the sensor data generated by the first sensor 110*a* or the second sensor 110*b* of the first set of sensors 110 as the sensor data for determining the leading end of the vehicle 102, the position of the leading end of the vehicle 102, the velocity of the vehicle 102, the velocity of the leading end of the vehicle 102, the position of the other end of the vehicle 102, and/or the velocity of the other end of the vehicle 102. Similarly, the controller 108 is configured to use one or more of the sensor data generated by the third sensor 112*a* or the fourth sensor 112*b* of the second set of sensors 112 as the sensor data for determining the leading end of the vehicle 102, the position of the leading end of the vehicle 102, the velocity of the vehicle 102, the velocity of the leading end of the vehicle 102, the position of the other end of the vehicle 102, and/or the velocity of the other end of the vehicle 102.

In some embodiments, the controller 108 is configured to fuse sensor data generated by different sensors of the first set of sensors 110 and/or the second set of sensors 112 by averaging, comparing, and/or weighting sensor data that is collected by the sensors of the first set of sensors 110 and/or the sensors of the second set of sensors 112 to generate fused sensor data. The controller 108 is then configured to use the fused sensor data as the sensor data for determining the leading end of the vehicle 102, calculating the distance the vehicle traveled, and/or the velocity of the vehicle 102. In some embodiments, the controller 108 is configured to calculate the distance traveled from a first object 120 based on a fusion of the sensor data generated by the first set of sensors 110 or the second set of sensors 112. In some embodiments, the controller 108 is configured to calculate the distance traveled from a first object 120 based on a fusion of the sensor data generated by the first set of sensors 110 and the second set of sensors 112. In some embodiments, the controller 108 is configured to calculate the velocity of the vehicle 102 based on a fusion of the sensor data generated by the first set of sensors 110 or the second set of sensors 112. In some embodiments, the controller 108 is configured to calculate the velocity of the vehicle 102 based on a fusion of the sensor data generated by the first set of sensors 110 and the second set of sensors 112.

To determine which of the first end 104 or the second end 106 of the vehicle 102 is the leading end of the vehicle 102 as the vehicle 102 moves along the guideway 114, the controller 108 is configured to compare a time the first sensor 110a detected an object 120 with a time the second sensor 110b detected the object 120, and to identify the first end 104 or the second end 106 as a leading end of the vehicle 102 based on the comparison of the time the first sensor 110a detected the object 120 with the time the second sensor 110b detected the object. For example, if the vehicle 102 is moving in the first direction 116, and the first end 104 of the vehicle 102 is already beyond object 120a, object 120a would have entered field of view 122a before object 120a entered field of view 122b. Based on a determination that object 120a entered field of view 122a before object 120a entered field of view 122b, the controller 108 determines that the first end 104 of the vehicle 102 is the leading end of the vehicle 102. But, if the vehicle 102 is moving in the second direction 118, and the first end 104 of the vehicle 102 has not yet traveled beyond object 120a, object 120a will enter field of view 122b before object 120a will enter field of view 122a. If the vehicle 102 continues moving in the second direction 118 such that the first set of sensors 110 detect object 120a, based on a determination that object 120a entered field of view 122b before object 120a entered field of view 122a, the controller 108 determines that the second end 106 of the vehicle 102 is the leading end of the vehicle 102. In some embodiments, to determine which of the first end 104 or the second end 106 of the vehicle 102 is the leading end of the vehicle 102 as the vehicle 102 moves along the guideway 114, the controller 108 is configured to compare a time the first sensor 110a detected an object 120 with a time the third sensor 112a detected the object 120, and to identify the first end 104 or the second end 106 as a leading end of the vehicle 102 based on the comparison of the time the first sensor 110a detected the object 120 with the time the third sensor 112a detected the object. In some embodiments, to determine which of the first end 104 or the second end 106 of the vehicle 102 is the leading end of the vehicle 102 as the vehicle 102 moves along the guideway 114, the controller 108 is configured to compare a time the third sensor 112a detected an object 120 with a time the fourth sensor 112b detected the object 120, and to identify the first end 104 or the second end 106 as a leading end of the vehicle 102 based on the comparison of the time the third sensor 112a detected the object 120 with the time the fourth sensor 112b detected the object.

In some embodiments, the controller 108 is configured to determine which of the first end 104 or the second end 106 is the leading end of the vehicle based on a determination of whether a relative velocity $V_{RELATIVE}$ of the sensors of the first set of sensors 110 or the sensors of the second set of sensors 112 with respect to a detected object 120 is a positive or a negative value. For example, if the sensors of the first set of sensors 110 detect an object 120 that is ahead of the vehicle 102 as the vehicle 102 moves in the first direction 116, the relative velocity $V_{RELATIVE}$ is negative as the sensors of the first set of sensors 110 "approach" the object 120. If the sensors of the second set of sensors 112 detect an object 120 that is behind the vehicle 102 as the vehicle 102 moves in the first direction 116, the relative velocity $V_{RELATIVE}$ is positive as the sensors of the second set of sensors 112 "depart" from the object 120.

The memory 109 comprises data that includes information describing the objects 120 and a geographic position of the objects 120. Based on the detection of an object 120, controller 108 is configured to query the memory 109 for the information describing the detected object 120 that the controller 108 is capable of using to identify the detected object 120. In some embodiments, the controller 108 is configured to determine the location of the detected object 120 based on a matching of the sensor data upon which detection of the object 120 is based and the information describing the objects 120 stored in memory 109. In some embodiments, the memory 109 comprises data that indicates the location of the detected object 120 that the controller 108 is configured to use to determine one or more of the location of the vehicle 102 along the guideway 113, a velocity of the vehicle 102, a change in position of the object 120, that the detected object 120 is a new object 120 that is absent from memory 109, that an expected object 120 is missing at a certain expected position.

In some embodiments, vehicle localization system 100 optionally comprises a positioning sensor package 126 that is configured to collect baseline data that is usable to identify a geographic location of a detected object 120 or plurality of objects 120. In some embodiments, positioning sensor package 126 comprises one or more sensors, localization systems, or connectivity to a vehicle-based speed, acceleration, velocity, orientation, position-determination system, or some other suitable system, sensor or combination of sensors capable of being used to identify a location of the vehicle 102, a sensor of the first set of sensors 110 or a sensor of the second set of sensors a time an object 120 or a plurality of objects 120 is detected by one or more sensors of the first set of sensors 110, one or more sensors of the second set of sensors 112, or identified as being detected by the controller 108. In some embodiments, the positioning sensor package 126 is configured to identify a location of an object 120 or a plurality of objects 120 that is associated with one or more of the identifiable unique properties corresponding to the object 120 or the plurality of objects 120. In some embodiments, the positioning sensor package 126 comprises a visible spectrum-based sensor localization system, a global-positioning-system (GPS) based localization system. In some embodiments, positioning sensor package 126 comprises a GPS or GPS equivalent used to initialize vehicle 102 location on the guideway 114 and tachometer/speed sensor for dead reckoning. In some embodiments, positioning sensor package 126 comprises a GPS or GPS equivalent used to initialize the vehicle 102 location on the guideway 114 and an accelerometer for dead reckoning. In some embodiments, positioning sensor package 126 comprises a GPS or GPS equivalent used to initialize the vehicle 102 location on the guideway 114 and an interurban multiple unit (IMU) for dead reckoning. In some embodiments, positioning sensor package 126 comprises a camera. In some embodiments, positioning sensor package 126 comprises an internal navigation system. In some embodiments, the baseline data collected or identified by the positioning sensor package 126 comprises a continuous reference position along the guideway 114. In some embodiments, the baseline data collected or identified by the positioning sensor package 126 comprises a centerline between rails of guideway 114.

The data that includes information describing the objects 120 and the geographic position of the objects 120 is one or more of data collected by the sensors of the first set of sensors 110, the sensors of the second set of sensors 112, or the positioning sensor package 126, or a result calculated by the controller 108 based on one or more of the sensor data, the baseline data, or some other suitable input the controller 108 is configured to use to determine information describing the object 120, the geographic position of the object 120, a condition at a time the object 120 was detected, a condition of one or more of the sensors at a time the object 120 was detected, a condition of the positioning sensor package 126 at a time the object was detected, or a condition of the vehicle 102 at a time the object 120 was detected. In some embodiments, controller 108 causes one or more of the sensor data, the information describing the objects 120, the baseline data or the geographic position to be stored in the memory 109. In some embodiments, one or more of the sensor data, the information describing the objects 120, the baseline data or the geographic position is pre-stored in the memory 109.

In some embodiments, the sensor data, the information describing the object 120, the geographic data, or other data stored in memory 109 comprises one or more of a time stamp, an angular position of the scanned plane with respect to the sensor's horizontal reference line (e.g., a vertical angular position), an angular position of the measured point in the plane with respect to the sensor's vertical reference line (e.g., a horizontal angular position, a time of flight of a reflected signal, a reflectivity level of the reflected signal, a strength of the reflected signal, or some other suitable metric. In some embodiments, the horizontal angular position of the reflected signal within the field of view of a sensor is determined with respect to a centerline extending along a center of the guideway 114. In some embodiments, the horizontal angular position of the reflected signal within the field of view of a sensor is determined with respect to a centerline extending along a center between the two rails of the guideway 114. In some embodiments, the reflectivity level is a function of the reflecting object properties such a shape of the object 120, a surface smoothness of the object 120, or a color of the object 120.

In some embodiments, the information describing a detected object 120 or a plurality of objects 120 that is one or more of based on sensor data collected by sensors 110 and/or sensors 112, baseline data collected by positioning sensor package 126, a geographic position of an object 120, or a determination made by controller 108 based on a detection of an object 120 establishes a unique signature that is assigned to a particular detected object 120 of a plurality of objects 120. In some embodiments, a plurality of objects 120 are identifiable as a pattern of objects 120 that, as a whole, are usable to determine a geographic location of the vehicle 102, a location of the vehicle 102 with respect to the guideway 114, a direction of travel of vehicle 102, a velocity of vehicle 102, a speed of vehicle 102, an acceleration of vehicle 102, an orientation of vehicle 102, some other suitable odometry of vehicle 102, or some other suitable information about vehicle 102. In some embodiments, a pattern of objects 120 is considered by the system 100 as a single entity to which a unique signature is assigned. In some embodiments, each individual object 120 included in a pattern of objects 120 has a unique signature and the pattern of objects 120 has a unique signature assigned to the pattern of objects 120 as a whole. In some embodiments, the controller 108 causes the unique signature assigned to an object 120 or a plurality of objects 120 to be stored in memory 109.

In some embodiments, the controller 108 is configured to use the unique signature of a detected object 120 or a pattern of objects 120 to determine one or more of a geographic location of the vehicle 102, a location of vehicle 102 with respect to the guideway 114, a direction of travel of vehicle 102, a velocity of vehicle 102, a speed of vehicle 102, an acceleration of vehicle 102, an orientation of vehicle 102, some other suitable odometry of vehicle 102, a location of vehicle 102 with respect to a guideway-associated structure, a location of vehicle 102 with respect to a guideway-associated platform, a location of vehicle 102 with respect to a guideway-associated signal, a location of vehicle 102 with respect to a guideway-associated building, a location of an object 120 with respect to another object 120, a location of an object 120 with respect to the guideway 114, or a location of an object 120 with respect to some other suitable reference position.

In some embodiments, a unique signature comprises one or more of an angular position that is unique on the guideway 114, a distance (time of flight) that is unique on the guideway 114, a reflectivity level (or signal strength) that is unique on the guideway 114, a combination of all or some of the sensor data or determined information regarding an object 120 that is unique on the guideway 114, or a combination of all or some of the above in the context of multiple nearby objects 120 that is unique on the guideway 114.

In some embodiments, controller 108 is configured to identify a pattern of objects 120 base on one or more of an angular position that is repeated every fixed distance within a predefined tolerance (e.g., ±10 cm), a distance (e.g., time of flight) that is repeated every fixed distance within a predefined tolerance (e.g., ±10 cm), a reflectivity level (or signal strength) that is repeated every fixed distance within a predefined tolerance (i.e. ±10 cm), a combination of all or some of the above that is repeated every fixed distance within a predefined tolerance (e.g., ±10 cm), or a combination of all or some of the above in the context of multiple nearby objects 120 that is repeated every fixed distance within a predefined tolerance (e.g., ±10 cm).

In some embodiments, controller 108 is configured to correlate the objects 120 with the unique signature or identified as being a repeated pattern of objects 120 with the baseline data to associate the objects 120 or the pattern of objects 120 with a specific location on along the guideway 114.

In some embodiments, the data stored in memory 109 comprising the information describing the objects 120, the sensor data collected by the sensors of the first set of sensors 110 or the sensors of the second set of sensors 112, the unique signatures of the objects 120, the geographic positions of the objects 120, etc. is a map of the geographic positions of the objects 120. In some embodiments, the controller 108 is configured to generate a map of the geographic positions of the objects 120 based on one or more of pre-stored data stored in the memory 109, the sensor data collected by the sensors of the first set of sensors 110 or the sensors of the second set of sensors 112, the unique signatures of the objects 120, the baseline data collected by the positioning sensor package 126.

In some embodiments, the system 100 is a self-learning map generation apparatus that is capable of mapping the geographic position of one or more objects 120 in real-time. In some embodiments, one or more of the sensor data collected by the sensors of the first set of sensors 110 or the sensors of the second set of sensors 112, the unique signatures of the objects 120, or the baseline data collected by the positioning sensor package 126 is the basis upon which a map indicating the geographic positions of the objects 120 is made.

In some embodiments, the controller 108 is configured to generate a map of the geographic positions of the objects 120 based on one or more of the sensor data collected by the sensors of the first set of sensors 110 or the sensors of the second set of sensors 112, the unique signatures of the objects 120, or the baseline data collected by the positioning sensor package 126 is the basis upon which a map indicating the geographic positions of the objects 120 is made in real-time.

In some embodiments, the map generated by the controller 108 represents a collection of guideway or wayside objects 120. In some embodiments, the map generated by the controller includes information regarding sensor data collected, one or more properties unique to an object 120, a distance to an object 120, the horizontal and vertical angular position of the object 120 within the field of view of a sensor with respect to a primary axis of the sensor, an object 120 reflectivity, or some other metric discussed herein, or some other suitable metric that is capable of being used to describe the object 120, to localize the object 120 with respect to the guideway 114, or to localize the vehicle 102 with respect to the guideway 114.

In some embodiments, vehicle localization system 100 comprises a central management system 130 offboard vehicle 102. In some embodiments, controller 108 is configured to be communicatively coupled with the central management system 130 to one or more of exchange information about vehicle 102, receive instructions related to controlling vehicle 102, communicate data the controller 108 causes to be stored in memory 109, sensor data collected by the sensors of the first set of sensors 110 or the sensors of the second set of sensors 112, the unique signatures of the objects 120, or the baseline data collected by the positioning sensor package 126, geographic positions of the objects 120, a map generated by the controller 108, or other suitable information.

In some embodiments, the central management system 130 comprises a master system map generation computer configured to collectively assemble a map generated by the controller 108 or data communicated to the central management system 130 into an overall system map that includes information that represents a collection of guideway or wayside objects 120. In some embodiments, the overall system map generated by the master system map generation computer includes information regarding sensor data collected, one or more properties unique to an object 120, a distance to an object 120, the horizontal and vertical angular position of the object 120 within the field of view of a sensor with respect to a primary axis of the sensor, an object 120 reflectivity, or some other metric discussed herein, or some other suitable metric that is capable of being used to describe the object 120, to localize the object 120 with respect to the guideway 114, or to localize the vehicle 102 with respect to the guideway 114.

In some embodiments, the controller 108 is configured to register each object 120 that is detected with the central management system 130. In some embodiments, the controller 108 is configured to communicate one or more of the sensor data collected by the sensors of the first set of sensors 110 or the sensors of the second set of sensors 112, the unique signatures of the objects 120, or the baseline data collected by the positioning sensor package 126, the geographic positions of the objects 120 based on the baseline data, a map generated by the controller 108, or other suitable information to the central management system 130 upon detection of each object 120. In some embodiments, the controller 108 is configured to communicate one or more of the sensor data collected by the sensors of the first set of sensors 110 or the sensors of the second set of sensors 112, the unique signatures of the objects 120, or the baseline data collected by the positioning sensor package 126, the geographic positions of the objects 120 based on the baseline data, a map generated by the controller 108, or other suitable information to the central management system 130 at a predefined schedule or upon receipt of an instruction to communicate with the central management system 130. Over time, the central management system uses one or more of the information received from the controller 108 or the map generated by the controller 108 to generate the overall system map, to identify any changes in the objects 120 identified in the overall system map, to update the overall system map, to update information or signatures describing or associated with the objects 120, to update the geographic location of an object 120, to add a newly identified object 120 along the guideway 114, to identify changes on or along the guideway 114, to identify potential problems associated with the guideway 114, to identify a need for guideway or vehicle 102-related maintenance, for some other suitable purpose.

In some embodiments, one or more of the controller 108 or the central management system 130 is configured to determine the geographic position of an object 120 based on the baseline data collected by the positioning sensor package 126 and cause the geographic position of the object 120 to be stored in memory 109 or be used to generate the system map at the controller 108 level, or the overall system map at the central management system 130 level. In some embodiments, the central management system 130 is configured to determine the geographic position of an object 120 based on the baseline data collected by the positioning sensor package 126 and cause the geographic position of the object 120 to be stored in a memory of the master system map generation computer.

In some embodiments, the central management system 130 is configured to cause one or more of the information describing the object 120, sensor data associated with the object 120, the unique signature usable to identify the object 120, the unique signature usable to identify a pattern of objects 120, or one or more properties associated with a pattern of objects 120 to be stored in the memory of the master system map generation computer.

Based on a receipt of the sensor data that indicates the presence of an object 120 along guideway 114, one or more of the controller 108 or the central management system 130 is configured to identify the object 120 by querying memory 109 or the memory of the master system map generation computer for the information describing the object 120, sensor data associated with the object 120, the unique signature usable to identify the object 120, the unique signature usable to identify a pattern of objects 120, or one or more properties associated with a pattern of objects 120. Then, based on a determination that the object 120 or the pattern of objects 120 matches a known object 120 or pattern of objects 120, the controller 108 or the central management system 120 identifies the geographic position of the object 120 based on the baseline data stored in the memory 109, the baseline data stored in the memory of the master system map generation computer, or the baseline data collected by the positioning sensor package 126 at a time the object 120 or the pattern of objects 120 is detected, which is associated with the information describing the object 120, sensor data associated with the object 120, the unique signature usable to identify the object 120, the unique signature usable to identify a pattern of objects 120, or one or more properties associated with a pattern of objects 120. The baseline data collected by the positioning sensor package 126 makes it possible for the controller 108 and/or the central management system 130 to generate the map of the objects 120 or the overall system map so that an object 120 is identifiable and has a verifiable geographic position. In some embodiments, the map generated by the controller 108 or the overall system map generated by the central management system 130 is updated to increase the reliability of the geographic positions of the objects 120 each time an object 120 is detected, and the position of the object is within a predetermined tolerance of an established geographic position in the map generated by the controller 108 or the overall system map generated by the central management system 130.

In some embodiments, the vehicle localization system 100 is associated with at least two vehicles 102. In some embodiments, a first controller 108 is onboard a first vehicle 102 that the positioning sensor package 126 onboard and a second controller 108 is onboard a second vehicle 102 that either has or is free from having a positioning sensor package 126 onboard. The first controller 108 is configured to share the baseline data collected by the positioning sensor package 126 with the central management system 130, which is configured to share the baseline data with the second controller 108 of the second vehicle 102. In some embodiments, the first controller 108 is configured to share the baseline data collected by the positioning sensor package 126 with the central management system 130, which is configured to share the overall system map that is generated using the shared the baseline data with the second controller 108 of the second vehicle 102. In some embodiments, one or more of the first controller 108 or the second controller 108 is configured to cause one or more of the shared overall system map or the shared baseline data to be stored in a corresponding second memory 109.

In some embodiments, the vehicle localization system 100 is associated with a plurality of vehicles 102, wherein the positioning sensor package 126 is onboard single vehicle 102. The controller 108 onboard the single vehicle 102 having the positioning sensor package 126 is used to one or more of collect the baseline data or generate a system map, or generate the overall system map. The controller 108 onboard the single vehicle 102 having the positioning sensor package 126 is configured to share the collected baseline data, the generated system map, or the generated the overall system map with the central management system 130 for distribution to the controllers 108 onboard the other vehicles 102 associated with the vehicle localization system 100. The controllers 108 onboard the other vehicles 102 that are free from having the positioning sensor package 126 onboard are configured to use only the shared baseline data or the shared overall system map and the sensors of the first set of sensors 110 and the sensors of the second set of sensors 112 to localize the vehicle 102 on the guideway 114, or determine the velocity, acceleration, direction of movement, or speed of the vehicle 102.

In some embodiments, the vehicle localization system 100 is associated with several vehicles 102 that have the positioning sensor package 126 onboard to collect the baseline data for sharing with the central management system 130. The controller 108 of each vehicle 102 that includes the positioning sensor package 126 is configured to generate the system map or share the baseline data with the central management system 130 to generate the overall system map while other vehicles 102 that are free from having the positioning sensor package 126 onboard have a controller 108 that is configured to use only the shared baseline data or the shared overall system map and the sensors of the first set of sensors 110 and the sensors of the second set of sensors 112 to localize the vehicle 102 on the guideway 114, or determine the velocity, acceleration, direction of movement, or speed of the vehicle 102.

In some embodiments, all vehicles 102 associated with vehicle localization system 100 have a positioning sensor package 126 onboard. The controller 108 associate with each vehicle 102 is configured to generate a system map and/or share the baseline data with the central management system 130 to generate the overall system map and to localize the vehicle 102 on the guideway 114 using one or more of the baseline data collected by the onboard positioning sensor package 126, the system map locally generated by the controller 108, or the overall system map and the sensors of the first set of sensors 110 and the sensors of the second set of sensors 112 and to determine the speed, acceleration, velocity, direction of travel, etc. of the vehicle 102 using the sensors of the first set of sensors 110 and the sensors of the second set of sensors 112.

In some embodiments, the central management system 130 is configured to one or more of perform consistency checks between different system maps generated based on sensor data collected by the same set sensors on a single vehicle 102, baseline data collected by the same or different positional sensor packages 126, or perform consistency checks between different system maps generated based on sensor data collected by different sets of sensors on different vehicles 102 or the same or different positional sensor packages 126.

The central management system is configured to compare the data sets sent by the one or more vehicles 102, and if the data set received from a vehicle 102 is determined to match within a predefined threshold limit with the data stored by the central management system 130 in the memory of the master system map generation computer, the central management system 130 initiates the creation of the overall system map. In some embodiments, the central management system 130 is configured to cause a maintenance alert to be generated based on a determination that the received data set is outside the predefined threshold limit. If the data set received by the central management system 130 is outside the predefined threshold limit, the central management system 130 is configured to output a maintenance message to initiate an inspection of the source of the mismatched data set. In some embodiments, the controller 108 of a vehicle 102 that was the source of the mismatched data set is configured to initiate a self-inspection to determine if one or more of the sensors of the first set of sensors 110, the sensors of the second set of sensors 112, or the positioning sensor package is faulty. In some embodiments, the maintenance message is communicated to a maintenance system associated with the vehicle localization system 100 to cause a technician to investigate the source of the mismatched data set.

In some embodiments, the sharing of one or more of the collected sensor data or the collected baseline data makes it possible for the overall system map generated by the central management system 130 to be a real-time self-learning system map without having dedicated markers such as RFID transponders or loop crossovers throughout an entirety of a guideway 114 system along which the vehicles 102 associated with system 100 are configured to travel.

In use, after overall system map is determined, communicated to the controller 108 of the vehicle 102, and stored in memory 109, as the vehicle 102 travels along guideway 114, the controller 108 causes one or more of the sensors of the first set of sensors 110 or one or more of the sensors of the second set of sensors 112 to collect the sensor data to detect the presence of one or more objects 120. To determine the position of the vehicle 102 along the guideway 114, the controller 108 is configured to compare the real-time collected data with the overall system map to localize the vehicle 102 on the guideway 114. When a match between the real-time collected sensor data and a unique object 120 or pattern of objects 120 in the map is determined, the vehicle 102 is localized to the guideway location associated with the detected object 120 or pattern of objects 120 based on the geographic position of the object 120 or the pattern of objects 120 included in the overall system map or based on the baseline data collected by the positioning sensor package 126 at the time the object 120 or the pattern of objects 120 is detected.

The controller 108 is configured to determine the vehicle location along the guideway 114 according to the generated map which generated in real-time based on the data collected by one or more of the sensors of the first set of sensors 110 or one or more of the sensors of the second set of sensors 112. The localization is done by matching the measurements made by one or more of the sensors of the first set of sensors 110 or one or more of the sensors of the second set of sensors 112 to the system map in locations with unique identification properties.

In case of a new trackside object 120 is added, and one or more of the sensors of the first set of sensors 110 or one or more of the sensors of the second set of sensors 112 detects the new object 120, the controller 108 is configured to store the sensor data associated with the new object 120 and cause the locally generated map to be updated. In some embodiments, the controller 108 is configured to share the sensor data associated with the new object 120 with the central management system 130 so that the overall system map is updated. In some embodiments, one or more of the controller 108 or the central management system 130 is configured to update the locally generated map, share the sensor data and/or baseline data associated with the new object 120, or update the overall system map based on one or more real-time or non-real-time verification rules that govern whether the sensor data and/or the baseline data associated with the new object 120 should be added to the locally generated map or the overall system map.

By including the ability to selectively update the generated map or the system map to include sensor data associated with the new object 120, the generated map or the system map is capable of being more easily updated and the localization of the vehicle 102 is able to be more accurately determined compared to localization systems that rely solely on the existence of dedicated markers installed on the guideway 114. These dedicated markers typically have significant installation cost which could be saved by basing localization data on the position of an object 120 detected based on sensor data and baseline data collected in real-time as opposed to installing dedicated RFID markers along the guideway, for example.

In some embodiments, the controller 108 is configured to run checks to determine if there are any changes to any attributes associated with the detected objects 120 (e.g. distance/range, angular position within the field of view, reflectivity, etc.) in the system map, or if an object 120 and/or pattern of objects 120 that was previously unknown is discovered or created, or if an object 120 and/or pattern of objects 120 that previously existed is no longer existing or is missing. In some embodiments, the controller 108 is configured to communicate the system check information to the central management system 130 to updating the overall system map. In some embodiments, the central management system 130 is configured to initiate a maintenance alert to the controller 108 to perform a self-check, perform or to a maintenance technician associated with the maintenance system to investigate or perform a suggested action or repair if a quantity of reports received from the controller 108 regarding the discovery of new objects 120 or patterns of objects 120, or the failure to detect expected objects 120 or patterns of objects 120, exceeds a predetermined threshold. In some embodiments, if a significant change to the an initial system map or the overall system map is detected as a result of adding an object 120, removing an object 120, changing a location of an object 120 or changing of a size or contour of the object 120 that is outside a predetermined threshold, the central management system 130 is configured to cause an alarm to be output to one or more of the maintenance system, the controller 108, or the vehicle 102. In some embodiments, the predetermined threshold is set to a level that avoids false positives that would be caused by relatively small objects that are on or along the guideway 114 that should not interfere with the operation of vehicle 102 along guideway 114. For example, the central management system 130 is capable of being set such that a paper cup thrown onto the guideway 114 will not initiate a maintenance alarm. In some embodiments, the controller 108 or the central management system 130 is configured to detect unintended or unauthorized chances in the guideway 114 such as unintentionally removed equipment or objects, added equipment or objects, changed equipment or objects, or failed equipment or objects.

In some embodiments, one or more of the central management system 130 or the controller 108 establishes an initial system map by causing the guideway 114 to be scanned by the sensors 110 and/or 112 and the positional sensor package 126, by sweeping the guideway 114 and the area surrounding the guideway 114 multiple times to ensure consistency between the different data sets identifying objects 120 along guideway 114 produced by the multiple sweeps.

In some embodiments, each sweep is performed by a same vehicle 102 associated with vehicle localization system 100, or by different vehicles 102 associated with vehicle localization system 100. For each sweep the controller 108 registers the sensor data, signatures, baseline data and geographic locations of a new set of objects 120, stores this information in memory 109, and locally generates a system map. In some embodiments, the controller 108 communicates the sensor data, signatures, baseline data and geographic locations of a new set of objects 120 to the central management system 130 each time a new object 120 is detected to generate the overall system map. In some embodiments, communicates the sensor data, signatures, baseline data and geographic locations of a new set of objects 120 to the central management system 130 at a predefined schedule, at a completion of a sweep of a defined portion or an entirety of the guideway 114, or after a predetermined quantity of sweeps is completed to generate the overall system map. In some embodiments, the controller 108 or the central management system 130 uses "big data" analytics fitting algorithms to find the best fit used as a common denominator map for all vehicles associated with vehicle localization system 100.

In some embodiments, if the sensor data, signatures, baseline data and/or geographic locations of the new set of objects 120 between different sweeps is inconsistent, or outside a predefined matching threshold, one or more of the controller 108 or the central management system 130 is configured to determine that a system map cannot be reliably generated. In some embodiments, the predefined matching threshold is based on a difference in geographic position of a detected object 120 as being within ±10 cm, or within some other suitable range of distances or other suitable metric. Based on a determination that a reliable system map cannot be generated, the controller or the central management system 130 is configured to generate a maintenance alert to initiate a self-check of the vehicle 102 or the system 100, or to alert a technician to investigate the source of the inconsistencies.

Based on a determination that the sensor data, signatures, baseline data and/or geographic locations of the new set of objects 120 between different sweeps is consistent (i.e., within the predefined matching threshold), the controller 108 or the central management system 130 is configured to determine the sensor data, signatures, baseline data and/or geographic locations of the new set of objects 120 as being valid and cause the system map or the overall system map to be generated. In some embodiments, if the controller 108 or the central management system 130 determines the sensor data, signatures, baseline data and/or geographic locations of the new set of objects 120 between different sweeps is consistent, then the controller 108 or the central management system 130 is configured to communicate a message to the maintenance system indicating that the system 100 is normal. Upon generation of a system map and/or an overall system map that is determined to be consistent, the controller 108 or the central management system 130 causes the locally generated system map to be shared with the central management system 130 and/or the central management system 130 causes the overall system map to be distributed to the vehicles 102 that are associated with vehicle localization system 100.

To determine the position of the vehicle 102, the controller 108 is configured to query the memory 109 for information describing a detected object 120 or unique identifies associated with the detected object 120. The information describing the detected object 120 is one or more of pre-stored in the memory 109, caused to be stored in the memory 109 by the controller 108 based on a previous detection of the object 120, or caused to be stored in the memory 109 by the controller 108 based on shared information received from the central management system 130. In some embodiments, memory 109 includes location information describing the geographic location of the detected object 120 such as that included in the system map generated by controller 108 or in the overall system map shared with the controller 108. In some embodiments, the memory 109 includes location information describing the distance d between object 120 and a previously detected object 120. In some embodiments, the controller 108 uses the location information to calculate a position of the leading end of the vehicle 102 based on the sensor data generated by one or more of the first sensor 110*a* or the second sensor 110*b*. For example, the controller 108 is configured to calculate the position of the leading end of the vehicle 102 based on the distance d between object 120*a* and object 120*b*. In some embodiments, the controller 108 is configured to identify a detected object 120 based on a matching of the sensor data and the information stored in the memory 109, use the baseline data detected by the positional sensor package 126 to determine the geographic position of the detected object 120, and calculate a position of the leading end of the vehicle 102 based on the sensor data generated by one or more of the first sensor 110*a* or the second sensor 110*b* with respect to the detected object 120 and then calculate the position of the vehicle 102 with respect to the guideway 114 based on the geographic position of the object 120 and the sensor data.

In some embodiments, the controller 108 is configured to calculate the position of the leading end of the vehicle 102 based on a calculated velocity of the vehicle 102 and a duration of time since the sensors of the first set of sensors 110 or the sensors of the second set of sensors 112 detected an object 120. In some embodiments, the position of the leading end of the vehicle 102 is determined with respect to the last detected object 120. In other embodiments, the controller 108 is configured to calculate the geographic location of the leading end of the vehicle 102 based on a position of the leading end of the vehicle 102 with respect to the geographic position of the object 120. In some embodiments, the controller 108 is configured to calculate the position of the other of the first end 104 or the second end 106 that is determined by the controller 108 to be other than the leading end of the vehicle 102 with respect to the leading end of the vehicle 102 based on a length q of the vehicle 102.

In some embodiments, the controller 108 is configured to match the real-time collected sensor data or detected signature associated with the detected object 120 to the system map. Once a match is found the location of vehicle 102 is determined with respect to the guideway location associated with the detected object 120 discovered by matching the detected signature with signatures used identify objects 120 in the system map. In some embodiments, the determination that a detected signature matches a known object 120 is subject consistency and plausibility checks. In some embodiments, the plausibility checks includes a determination of whether the signature is the expected signature based on the previously accepted signature, whether the distance traveled since the previously accepted signature matches the expected distance between these the two points within a predefined tolerance. In some embodiments, the predefined tolerance about ±5 m. In some embodiments, the predefined tolerance is some other suitable distance. In some embodiments, controller 108 is configured to search for a next location point to re-localize the vehicle 102 is an expected localization point or points is not detected by the sensors 110 or 112 of interference. In some embodiments, if an expected localization point is not detected, the controller 108 is configured to search for the next location point to re-localize the vehicle with an increasing location uncertainty. In some embodiments, the controller 108 is configured to limit the quantity of missed localization points allowed before a safety protocol enforced by the controller 108. In some embodiments, the controller 108 is configured to cause the vehicle to slow down, brake, stop, sound an alarm, or perform some other suitable action if the maximum number of missed localization points exceeds a predefined threshold value, or if a maximum accumulated location uncertainty exceeds a predefined threshold value. For example, if an acceptable level of uncertainty is predefined as being within ±5 m, then the increased level of uncertainty is optionally capped a higher level such as ±10 m to allow some operational flexibility and give the vehicle 102 more time to localize before the controller 108 initiates a safety protocol.

In some embodiments, controller 108 is configured to determine the position of the vehicle 102 based on a distance the vehicle traveled from a last known position of the vehicle 102. In some embodiments, consecutive objects 120 are pairs of objects separated by a distance d stored in memory 109. The controller 108 is configured to count a quantity of objects 120 detected by the first set of sensors 110 or the second set of sensors 112 during a predetermined duration of time, search the memory 109 for the stored distance d between each pair of consecutive objects 120 detected during the predetermined duration of time, and add the distances d between each pair of consecutive objects 120 for the quantity of objects 120 that are detected to determine a total distance the vehicle 102 traveled during the predetermined duration of time.

In some embodiments, the controller 108 is configured to count a quantity of pattern elements detected since a particular object 120 was detected, and to add the distance d between the detected quantity to determine the distance the vehicle traveled over a predetermined duration of time. In some embodiments, the controller 108 is configured to integrate the velocity of the vehicle 102 in the time domain to determine the distance the vehicle traveled. If, for example, the distance d between consecutive objects is greater than a predetermined distance, then the controller 108 is configured to determine the distance the vehicle 102 traveled based on the integral of the velocity of the vehicle in the time domain. Then, upon the detection of a next object 102, the controller 108 is configured to use the distance d between the consecutive objects 120 to correct the distance the vehicle 102 traveled.

In some embodiments, the controller 108 is configured to calculate the distance traveled by the vehicle 102, if the distance d between the objects 120 is substantially equal, based on equation (2), below $$D=(n-1)*d \qquad (2)$$

where:
D is the traveled distance from a particular object,
n is the quantity of objects detected in the duration of time since the particular object was detected, and
d is the separation distance between two consecutive objects.

In some embodiments, the controller 108 is configured to calculate the distance traveled by the vehicle 102, if the vehicle 102 is traveling at a velocity and the time interval between consecutive objects 120 is constant, based on equation (3), below $$D=\Sigma V \Delta t \qquad (3)$$

where:
D is the traveled distance from a known object over a predetermined duration of time,
V is the velocity of the vehicle, and
$\Delta t$ is the predetermined duration of time.

In some embodiments, the sensors of the first set of sensors 110 and the sensors of the second set of sensors 112 are configured to determine a distance between the sensor and the detected object 120 in the field of view of the sensor along the line of sight of the sensor. In some embodiments, the controller 108 is configured to use the distance between the sensor and the detected object 120 to calculate the position of the vehicle 102.

The controller 108 is configured to calculate the velocity of the vehicle based on the distance the vehicle 102 traveled within a predetermined duration of time. In some embodiments, the predetermined duration of time has an interval ranging from about 1 second to about 15 minutes.

In some embodiments, the controller 108 is configured to calculate the velocity of the vehicle 102 based on a quantity of objects 120 detected within a predetermined duration of time and the distance d between consecutive objects 120. In some embodiments, the controller 108 is configured to calculate the velocity of the vehicle 102 based on a relative velocity $V_{RELATIVE}$ between the sensors of the first set of sensors 110 and/or the sensors of the second set of sensors 112 and the detected object 120. In some embodiments, the relative velocity $V_{RELATIVE}$ is based on a calculated approach or departure speed of the sensors with respect to a detected object 120. The controller 108 is configured to use the relative velocity $V_{RELATIVE}$ of the sensors of the first set of sensors 110 and/or the sensors of the second set of sensors 112 if the distance d between the objects 120 is greater than a predefined threshold until a next object 120 is detected. Upon the detection of a next object 120, the controller 108 is configured to calculate the velocity of the vehicle 102 based on the distance the vehicle 102 traveled over the duration of time since the sensors of the first set of sensors 110 and/or the sensors of the second set of sensors 112 last detected an object 120. In some embodiments, the sensors of the first set of sensors 110 and the sensors of the second set of sensors 112 are configured to determine the relative velocity $V_{RELATIVE}$ with respect to a detected object 120 in the field of view of the sensor along the line of sight of the sensor.

In some embodiments, the controller 108 is configured to calculate the velocity of the vehicle, if the distance d between the objects 120 is substantially equal, based on equation (4), below, $$V=(n-1)*d/t \qquad (4)$$

where
V is the velocity of the vehicle,
n is the quantity of objects detected within the predetermined duration of time,
d is the distance between consecutive objects, and
t is the predetermined duration of time.

In some embodiments, the controller 108 is configured to calculate the velocity of the vehicle based on the relative velocity $V_{RELATIVE}$ based on equation (5), below $$V=V_{RELATIVE}/\mathrm{Cos}(\Theta) \qquad (5)$$

where
V is the velocity of the vehicle,
$V_{RELATIVE}$ is the relative speed between a sensor and the detected object, and
$\Theta$ is the inclination angle of the sensor.

In some embodiments, the controller 108 is configured to determine the ground speed, direction and displacement of the vehicle 102 from a known object using the real-time collected sensors data using a sliding window odometry method which determines the speed and displacement by determining the local trajectory of one or more of the sensors of the first set of sensors 110 or one or more of the sensors of the second set of sensors 112. The sliding window method allows the controller 108 to determine the true ground speed and displacement of the vehicle 102 without any distortion as a result wheel spin and/or slide or wheel diameter calibration inaccuracies.

In some embodiments, the controller 108 is configured to combine different techniques of determining the distance the vehicle 102 traveled from a particular object 120, the position of the vehicle 102, and/or the velocity of the vehicle 102. In some embodiments, controller 108 is configured to take one or more of processing time and delays, the field of view of the sensor, the sensor resolution, and any environmental conditions into consideration when calculating the vehicle speed, velocity, position or distance travelled.

To combine the different techniques of determining the distance the vehicle 102 traveled from a particular object 120, the controller 108 is configured to average a first calculated distance and a second calculated distance. For example, the first calculated distance that the vehicle 102 traveled is based on the quantity of objects 120 detected (e.g., equation 2), and the second calculated distance that the vehicle 102 traveled is based on the integration of the velocity of the vehicle 102 in the time domain (e.g., equation 3). In some embodiments, the controller 108 is configured to weight the first calculated distance or the second calculated distance based on a preset weighting factor. For example, if the first calculated distance is likely more accurate than the second calculated distance based on various factors, then the controller 108 is configured to give the first calculated distance a higher weight than the second calculated distance when averaging the first calculated distance and the second calculated distance. Similarly, if the second calculated distance is likely more accurate than the first calculated distance based on various factors, then the controller 108 is configured to give the second calculated distance a higher weight than the first calculated distance when averaging the first calculated distance and the second calculated distance.

In some embodiments, the controller 108 is configured to use a speed-based weighted average of a first calculated distance that the vehicle 102 traveled based on the quantity of objects 120 detected and a second calculated distance that the vehicle 102 traveled based on the integration of the velocity of the vehicle 102 in the time domain. For example, if the vehicle 102 is moving at a speed lower than a threshold value, then the controller 108 is configured to give the distance traveled based on the integral of the velocity of the vehicle 102 in the time domain a higher weight than the distance d that the vehicle 102 traveled based on the quantity of objects 120 detected, because the time interval between consecutive objects 120 is greater than if the vehicle 102 is traveling at a velocity greater than the threshold value. For example, if the vehicle is moving at a speed greater than the threshold value, then the controller 108 is configured to give the distance traveled based on the distances d between the quantity of objects 120 detected a higher weight than the distance traveled based on the integral of the velocity of the vehicle 102 in the time domain.

To combine the different techniques of determining the velocity of the vehicle 102, the controller 108 is configured to average a first calculated velocity and a second calculated velocity. For example, the first calculated velocity of the vehicle 102 is based on the quantity of objects 120 detected within the predetermined duration of time (e.g., equation 4) and the second calculated velocity based on the relative velocity $V_{RELATIVE}$ between the sensors of the first set of sensors 110 and/or the sensors of the second set of sensors 112 and the objects 120 (e.g., equation 5) duration. The controller 108 is configured to calculate the velocity of the vehicle 102 by averaging the first calculated velocity and the second calculated velocity if the distance d between consecutive objects 120 is below a predefined threshold. In some embodiments, the controller 108 is configured to weight the first calculated velocity or the second calculated velocity based on a preset weighting factor. For example, if the first calculated velocity is likely more accurate than the second calculated velocity based on various factors, then the controller 108 is configured to give the first calculated velocity a higher weight than the second calculated velocity when averaging the first calculated velocity and the second calculated velocity. Similarly, if the second calculated velocity is likely more accurate than the first calculated velocity based on various factors, then the controller 108 is configured to give the second calculated velocity a higher weight than the first calculated velocity when averaging the first calculated velocity and the second calculated velocity.

In some embodiments, the average of the first calculated velocity and the second calculated velocity is a speed-based weighted average. For example, if the velocity of the vehicle is below a predefined threshold, then the controller 108 is configured to give the calculated velocity based on the relative velocity $V_{RELATIVE}$ between the sensors of the first set of sensors 110 and/or the sensors of the second set of sensors 112 and the objects 120 a higher weight than the velocity of the vehicle calculated based on the quantity of detected objects 120. For example, if the velocity of the vehicle 102 is greater than the predefined threshold, then the controller 108 is configured to give the velocity calculated based on the quantity of objects 120 detected during the predetermined duration of time a higher weight than the velocity of the vehicle 102 based on the relative velocity $V_{RELATIVE}$ between the sensors of the first set of sensors 110 and/or the sensors of the second set of sensors 112 and the objects 120.

The controller 108 is configured to perform consistency checks to compare the determinations or calculations that are based on the sensor data generated by the sensors of the first set of sensors 110 and the sensors of the second set of sensors 112. For example, the controller 108 is configured to determine if a leading end determination based on the sensor data generated by the first sensor 110a matches a leading end determination based on the sensor data generated by the second sensor 110b. The controller 108 is also configured to determine if a position or distance traveled calculation based on the sensor data generated by the first sensor 110a matches a corresponding position or distance traveled calculation based on the sensor data generated by the second sensor 110b. The controller 108 is further configured to determine if a velocity calculation based on the sensor data generated by the first sensor 110a matches a velocity calculation based on the sensor data generated by the second sensor 110b.

In some embodiments, the predefined tolerances within which any comparison of sensor performance falls to be considered matching is set such that the ranges are wide enough to avoid false positives, narrow enough to avoid too many falsely accepted measurements, and are established based on a position and orientation onboard vehicle 102.

In some embodiments, the controller 108 is configured to determine if a leading end determination based on the sensor data generated by the sensors of the first set of sensors 110 matches a leading end determination based on the sensor data generated by the sensors of the second set of sensors 112. In some embodiments, the controller 108 is configured to determine if a position or distance traveled calculation based on the sensor data generated by the sensors of the first set of sensors 110 matches a corresponding position or distance traveled calculation based on the sensor data generated by the sensors of the second set of sensors 112. In some embodiments, the controller 108 is configured to determine if a velocity calculation based on the sensor data generated by the sensors of the first set of sensors 110 matches a velocity calculation based on the sensor data generated by the sensors of the second set of sensors 112.

The controller 108 is configured to identify one or more of the first sensor 110a, the second sensor 110b, the third sensor 112a or the fourth sensor 112b as being faulty based on a determination that a mismatch between one or more of the calculated leading end of the vehicle 102, the calculated position of the vehicle 102, the calculated distance the vehicle 102 traveled, or the calculated velocity of the vehicle 102 results in a difference between the calculated values that is greater than a predefined threshold. The controller 108, based on a determination that at least one of the sensors is faulty, generates a message indicating that at least one of the sensors is in error. In some embodiments, the controller 108 is configured to identify which sensor of the first set of sensors 110 or the second set of sensors 112 is the faulty sensor. In some embodiments, to identify the faulty sensor, the controller 108 is configured to activate one or more of the first auxiliary sensor 110c or the second auxiliary sensor 112c, and compare a calculated value of the first set of sensors 110 or the second set of sensor 112 for the leading end of the vehicle 102, the position of the vehicle 102, the distance the vehicle 102 traveled and/or the velocity of the vehicle 102 with the corresponding sensor data generated by one or more of the first auxiliary sensor 110c or the second auxiliary sensor 112c. The controller 108 is configured to identify which of the first sensor 110a, the second sensor 110b, the third sensor 112a and/or the fourth sensor 112b is faulty based on a determination that at least one of the calculated values of the first set of sensors 110 or the second set of sensor 112 matches the calculated value based on the sensor data generated by the first auxiliary 110c and/or the second auxiliary sensor 112c within the predefined threshold.

In some embodiments, the controller 108 is configured to calculate a first velocity of the leading end of the vehicle 102 based on the sensor data generated by the set of sensors on the end of the vehicle 102 identified as being the leading end of the vehicle 102, and calculate a second velocity of the other of the first end or the second end that is other than the leading end of the vehicle 102 based on the sensor data generated by the set of sensors on the end of the vehicle 102 that is other than the leading end of the vehicle 102. The controller 108 is also configured to generate an alarm based on a determination that a magnitude of the first velocity differs from a magnitude of the second velocity by more than a predefined threshold. In some embodiments, if the first velocity differs from the second velocity by more than the predefined threshold, the controller 108 is configured to cause the vehicle 102 to be braked to a stop via an emergency brake actuated by the controller 108. In some embodiments, the predefined threshold within which the velocity is allowed to differ before the controller causes the vehicle 102 to stop is set to about ±1 kph. In some embodiments, some other suitable predefined threshold range is set based on moving speed of the vehicle 102, environmental condition within which the vehicle 102 is operating, or a type of cargo, for example. In some embodiments, controller 108 is configured to allow the speed differential to occur for a predefined period of time before the controller 108 causes the vehicle to stop. In some embodiments, the controller 108 is configured to allow the speed differential to persist for 1 second. In some embodiments, the controller 108 is configured to allow the speed differential to persist for some other suitable period of time.

Similarly, in some embodiments, the controller 108 is configured to generate an alarm if the position of the leading end of the vehicle 102 calculated based on the sensor data generated by one of more of the first sensor 110a or the second sensor 110b differs from the position of the leading end of the vehicle 102 calculated based on the sensor data generated by one or more of the third sensor 112a or the fourth sensor 112b by more than a predefined threshold. For example, if the first end 104 of the vehicle 102 is determined to be the leading end of the vehicle 102, the first set of sensors 110 are closer to the leading end of the vehicle 102 than the second set of sensors 112. The controller 108 is configured to determine the position of the leading end of the vehicle 102 based on the sensor data generated by the first set of sensors 110, and based on the sensor data generated by the second set of sensors 112 in combination with the length q of the vehicle 102. If the position of the leading end of the vehicle 102 based on the sensor data generated by the first set of sensors 110 differs from the position of the leading end of the vehicle 102 based on the combination of the sensor data generated by the second set of sensors 112 and the length q of the vehicle 102 by more than the predefined threshold, such a difference could be indicative of an unexpected separation between the first end 104 and the second end 106 of the vehicle 102. Alternatively, such a difference between calculated position of the leading end of the vehicle could be an indication that there is a crumple zone between the first end 104 and the second end 106 of the vehicle.

In some embodiments, if the calculated position of the leading end of the vehicle 102 based on the sensor data generated by the first set of sensors differs from the position of the leading end of the vehicle based on the sensor data generated by the second set of sensors by more than the predefined threshold, the controller 108 is configured to cause the vehicle 102 to be braked to a stop via an emergency brake actuated by the controller 108.

The system 100 eliminates the need for wheel spin/slide detection and compensation and wheel diameter calibration. Wheel circumference sometimes varies by about 10-20%, which results in about a 5% error in velocity and/or position/distance traveled determinations that are based on wheel rotation and/or circumference. Additionally, slip and slide conditions also often cause errors in velocity and/or position/distance traveled determinations during conditions which result in poor traction between a wheel of the vehicle 102 and the guideway 114, even with the use of accelerometers because of variables such as vehicle jerking.

The sensors of the first set of sensors 110 and the sensors of the second set of sensors 112 are positioned on the first end 104 or the second end 106 of the vehicle 102 independent of any wheel and/or gear of the vehicle 102. As a result the calculated velocity of the vehicle 102, position of the vehicle 102, distance traveled by the vehicle 102, or the determination of the leading end of the vehicle 102 are not sensitive to wheel spin or slide or wheel diameter calibration errors, making the calculations made by the system 100 more accurate than wheel-based or gear-based velocity or position calculations. In some embodiments, the system 100 is capable of calculating the speed and/or the position of the vehicle 102 to a level of accuracy greater than wheel-based or gear-based techniques, even at low speeds, at least because the sensors of the first set of sensors 110 and the sensors of the second set of sensors 112 make it possible to calculate a distance traveled from, or a positional relationship to, a particular object 120 to within about +/−5 centimeters (cm).

Additionally, by positioning the sensors of the first set of sensors 110 and the sensors of the second set of sensors 112 away from the wheels and gears of the vehicle, the sensors of the first set of sensors 110 and the sensors of the second set of sensors 112 are less likely to experience reliability issues and likely to require less maintenance compared to sensors that are installed on or near a wheel or a gear of the vehicle 102.

In some embodiments, system 100 is usable to determine if the vehicle 102 moved in a power-down mode. For example, if the vehicle 102 is powered off today, the vehicle optionally re-establishes positioning before the vehicle can start moving along the guideway 114. On start-up, the controller 108 is configured to compare an object 120 detected by the sensors of the first set of sensors 110 or the sensors of the second set of sensors 112 with the object 120 that was last detected before the vehicle was powered down. The controller 108 is then configured to determine that the vehicle 102 has remained in the same location as when the vehicle 102 was powered-down if the object 120 last detected matches the object 120 detected upon powering-on vehicle 102.

The system 100 makes it possible to localize the vehicle 102 without such localization being entirely dependent on dedicated markers that are costly to install and maintain by establishing a real-time self-learning generated system map of objects 120 that are identified based on sensor data such as LIDAR, or other suitable sensor. In some embodiments, the system 100 has an overarching central management capability that facilitate real-time maintenance monitoring of the objects 120, the vehicle 102, and/or the sensors associated with system 100. The monitoring system makes it possible for the controller 108 or the central management system 130 to detect changes in the system map such as added equipment, removed equipment and changes to the guideway properties, update the system map, and initiate system repairs or diagnostics with or without human acknowledgement or intervention.

Figure 2:
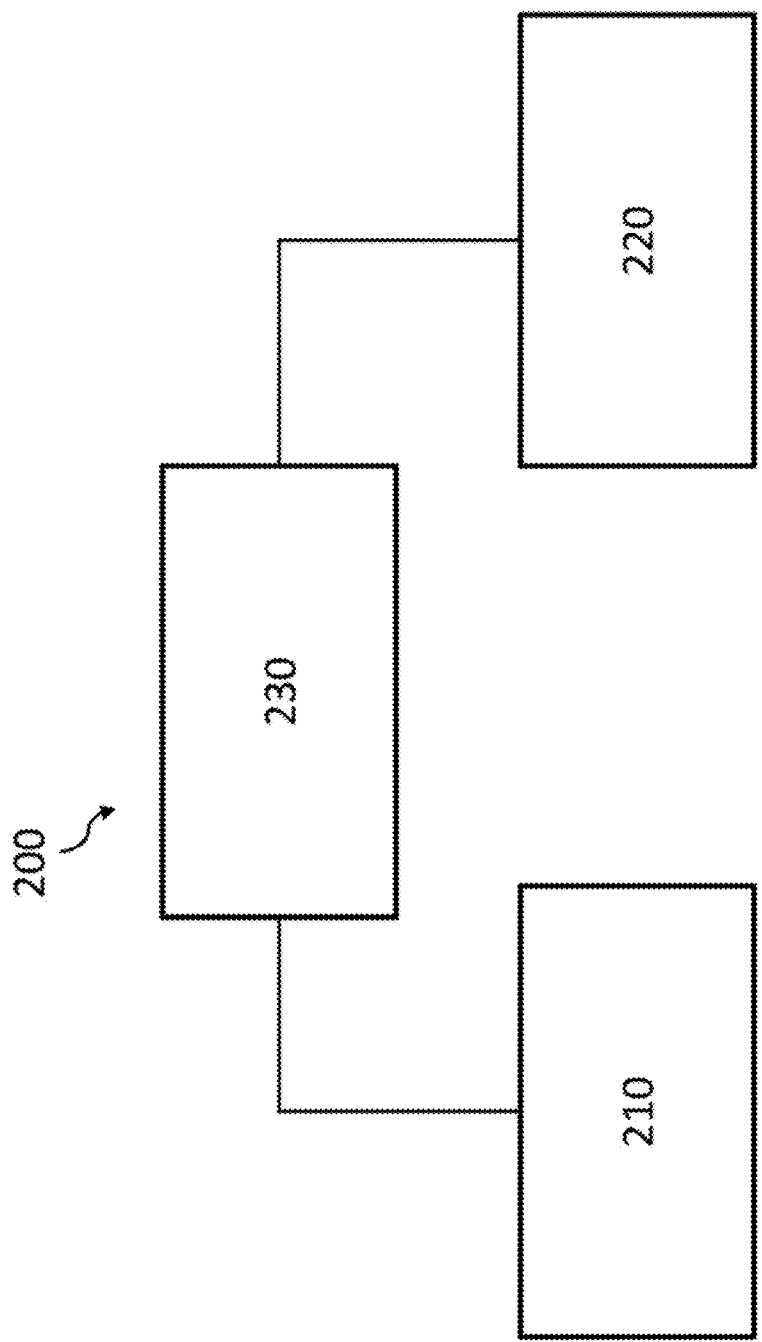
FIG. 2 is a block diagram of a fusion sensor arrangement in accordance with one or more embodiments.

FIG. 2 is a block diagram of a fusion sensor arrangement 200 in accordance with one or more embodiments. Fusion sensor arrangement 200 includes first sensor 210 configured to receive a first type of information. Fusion sensor arrangement 200 further includes a second sensor 220 configured to receive a second type of information. In some embodiments, the first type of information is different from the second type of information. Fusion sensor arrangement 200 is configured to fuse information received by first sensor 210 with information received by second sensor 220 using a data fusion center 230. Data fusion center 230 is configured to determine whether an object 120 (FIG. 1) is detected within a detection field of either first sensor 210 or second sensor 220. Data fusion center 230 is also configured to resolve conflicts between first sensor 210 and second sensor 220 arising when one sensor provides a first indication and the other sensor provides another indication.

In some embodiments, fusion sensor arrangement 200 is usable in place of one or more of the first sensor 110a (FIG. 1), the second sensor 110b (FIG. 1), the first auxiliary sensor 110c (FIG. 1), the third sensor 112a (FIG. 1), the fourth sensor 112b (FIG. 1), or the second auxiliary sensor 112c (FIG. 1). In some embodiments, first sensor 210 is usable in place of first sensor 110a and second sensor 220 is usable in place of second sensor 110b. Similarly, in some embodiments, first sensor 210 is usable in place of the third sensor 112a, and second sensor 220 is usable in place of fourth sensor 112b. In some embodiments, data fusion center 230 is embodied within controller 108. In some embodiments, controller 108 is data fusion center 230. In some embodiments, data fusion arrangement 200 includes more than the first sensor 210 and the second sensor 220.

In some embodiments, first sensor 210 and/or second sensor 220 is an optical sensor configured to capture information in a visible spectrum. In some embodiments, first sensor 210 and/or second sensor 220 includes a visible light source configured to emit light which is reflected off objects along the guideway or the wayside of the guideway. In some embodiments, the optical sensor includes a photodiode, a charged coupled device (CCD), or another suitable visible light detecting device. The optical sensor is capable of identifying the presence of objects as well as unique identification codes associated with detected objects. In some embodiments, the unique identification codes include barcodes, alphanumeric sequences, pulsed light sequences, color combinations, geometric representations or other suitable identifying indicia.

In some embodiments, first sensor 210 and/or second sensor 220 includes a thermal sensor configured to capture information in an infrared spectrum. In some embodiments, first sensor 210 and/or second sensor 220 includes an infrared light source configured to emit light which is reflected off objects along the guideway or the wayside of the guideway. In some embodiments, the thermal sensor includes a Dewar sensor, a photodiode, a CCD or another suitable infrared light detecting device. The thermal sensor is capable of identifying the presence of an object as well as unique identifying characteristics of a detected object similar to the optical sensor.

In some embodiments, first sensor 210 and/or second sensor 220 includes a LiDAR sensor configured to capture information in the ultraviolet, visible, or infrared spectrum. In some embodiments, first sensor 210 and/or second sensor 220 includes a laser or other suitable light source configured to emit electromagnetic radiation which is reflected off objects along the guideway or the wayside of the guideway. The LiDAR sensor is capable of identifying the presence of an object as well as unique identifying characteristics of a detected object similar to the optical sensor.

In some embodiments, first sensor 210 and/or second sensor 220 includes a RADAR sensor configured to capture information in a microwave spectrum. In some embodiments, first sensor 210 and/or second sensor 220 includes a microwave emitter configured to emit electromagnetic radiation which is reflected off objects along the guideway or the wayside of the guideway. The RADAR sensor is capable of identifying the presence of an object as well as unique identifying characteristics of a detected object similar to the optical sensor.

In some embodiments, first sensor 210 and/or second sensor 220 includes a laser sensor configured to capture information within a narrow bandwidth. In some embodiments, first sensor 210 and/or second sensor 220 includes a laser light source configured to emit light in the narrow bandwidth which is reflected off objects along the guideway or the wayside of the guideway. The laser sensor is capable of identifying the presence of an object as well as unique identifying characteristics of a detected object similar to the optical sensor.

First sensor 210 and second sensor 220 are capable of identifying an object without additional equipment such as a guideway map or location and speed information. The ability to operate without additional equipment decreases operating costs for first sensor 210 and second sensor 220 and reduces points of failure for fusion sensor arrangement 200.

Data fusion center 230 includes a non-transitory computer readable medium configured to store information received from first sensor 210 and second sensor 220. In some embodiments, data fusion center 230 has connectivity to memory 109 (FIG. 1). Data fusion center 230 also includes a processor configured to execute instructions for identifying objects detected by first sensor 210 or second sensor 220. The processor of data fusion center 230 is further configured to execute instructions for resolving conflicts between first sensor 210 and second sensor 220.

Data fusion center 230 is also capable of comparing information from first sensor 210 with information from second sensor 220 and resolving any conflicts between the first sensor and the second sensor.

In some embodiments, when one sensor detects an object but the other sensor does not, data fusion center 230 is configured to determine that the object is present. In some embodiments, data fusion center 230 initiates a status check of the sensor which did not identify the object.

The above description is based on the use of two sensors, first sensor 210 and second sensor 220, for the sake of clarity. One of ordinary skill in the art would recognize that additional sensors are able to be incorporated into fusion sensor arrangement 200 without departing from the scope of this description. In some embodiments, redundant sensors which are a same sensor type as first sensor 210 or second sensor 220 are included in fusion sensor arrangement 200.

Figure 3A:
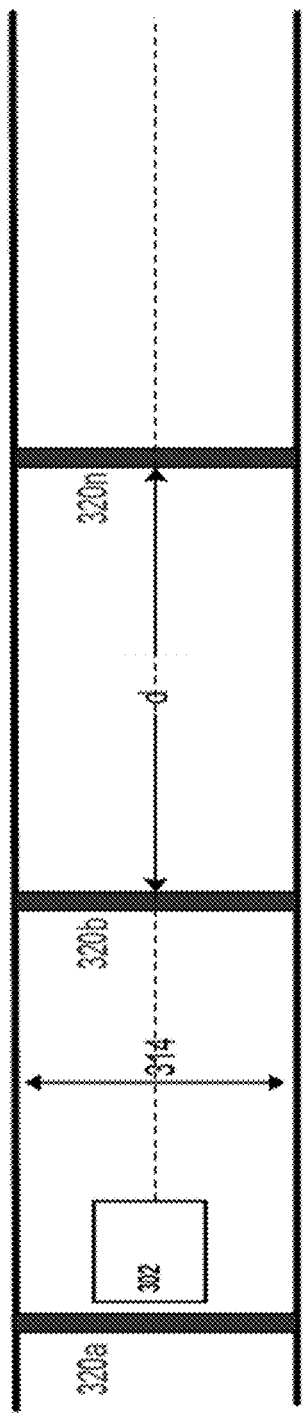
FIG. 3A is a top-side view of a guideway mounted vehicle, in accordance with one or more embodiments.

FIG. 3A is a top-side view of a guideway mounted vehicle 302, in accordance with one or more embodiments. Vehicle 302 comprises the features discussed with respect to vehicle 102 (FIG. 1). Vehicle 302 includes vehicle localization system 100 (FIG. 1), and is configured to move over guideway 314. Guideway 314 is a two-rail example of guideway 114 (FIG. 1). Objects 320*a*-320*n*, where n is an integer greater than 1, correspond to objects 120 (FIG. 1). Objects 320*a*-320*n* are on the guideway 314. In this example embodiment, objects 320*a*-320*n* are railroad ties separated by the distance d.

Figure 3B:
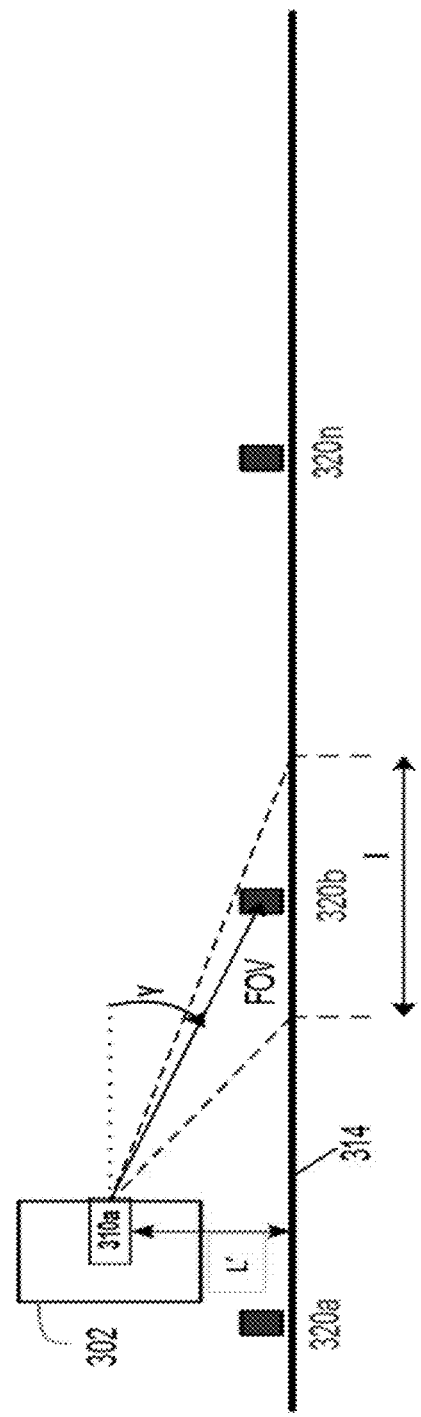
FIG. 3B is a side view of vehicle, in accordance with one or more embodiments.

FIG. 3B is a side view of vehicle 302, in accordance with one or more embodiments. Vehicle 302 is configured to travel over objects 320*a*-320*n*. First sensor 310*a* corresponds to first sensor 110*a* (FIG. 1). First sensor 310*a* is positioned on the first end of vehicle 302 at a distance L' from the guideway 314. First sensor 310*a* is directed toward the guideway 314 to detect objects 320*a*-320*n*. Accordingly, first sensor 310*a* has an inclination angle γ that corresponds to inclination angle α1 (FIG. 1) of the first sensor 110*a*. First sensor 310*a* has a field of view FOV that corresponds to field of view 122*a* (FIG. 1). Based on the inclination angle γ, the field of view FOV, and the distance L', first sensor 310*a* has a detection span I (as calculated based on equation 1). One of ordinary skill would recognize that the sensors of the first set of sensors 110 (FIG. 1) and the sensors of the second set of sensors 112 (FIG. 1) have properties similar to those discussed with respect to sensor 310*a* that vary based on the position of the sensor on the vehicle 102.

Figure 4A:
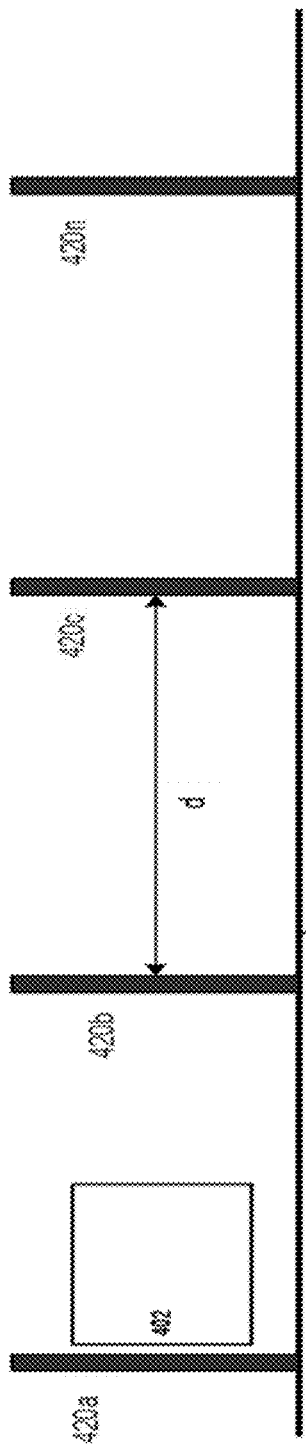
FIG. 4A is a side view of a guideway mounted vehicle, in accordance with one or more embodiments.

FIG. 4A is a side view of a guideway mounted vehicle 402, in accordance with one or more embodiments. Vehicle 402 comprises the features discussed with respect to vehicle 102 (FIG. 1). Vehicle 402 includes vehicle localization system 100 (FIG. 1), and is configured to move over guideway 414. Guideway 414 is a two-rail example of guideway 114 (FIG. 1). Objects 420*a*-420*n*, where n is an integer greater than 1, correspond to objects 120 (FIG. 1). Objects 420*a*-420*n* are on the wayside of the guideway 414. In this example embodiment, objects 420*a*-420*n* are posts on the wayside of the guideway 414 separated by the distance d.

Figure 4B:
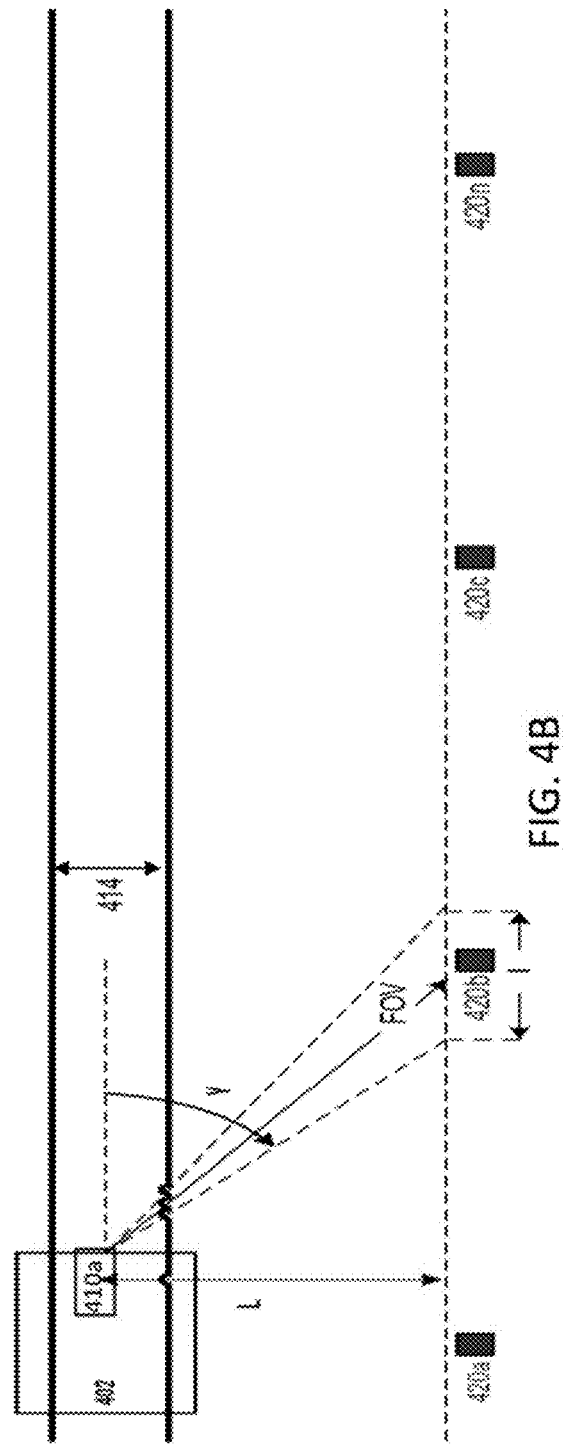
FIG. 4B is a top-side view of vehicle, in accordance with one or more embodiments.

FIG. 4B is a top-side view of vehicle 402, in accordance with one or more embodiments. Vehicle 402 is configured to travel over guideway 414. Objects 420*a*-420*n* are on the wayside of the guideway 414. First sensor 410*a* corresponds to first sensor 110*a* (FIG. 1). First sensor 410*a* is positioned on the first end of vehicle 402 at a distance L from the objects 420*a*-420*n*. First sensor 410*a* is directed toward objects 420*a*-420*n*. Accordingly, first sensor 410*a* has an inclination angle γ that corresponds to inclination angle α1 (FIG. 1) of the first sensor 110*a*. First sensor 410*a* has a field of view FOV that corresponds to field of view 122*a* (FIG. 1). Based on the inclination angle γ, the field of view FOV, and the distance L, first sensor 410*a* has a detection span I. One of ordinary skill would recognize that the sensors of the first set of sensors 110 (FIG. 1) and the sensors of the second set of sensors 112 (FIG. 1) have properties similar to those discussed with respect to sensor 410*a* that vary based on the position of the sensor on the vehicle 102.

Figure 5:
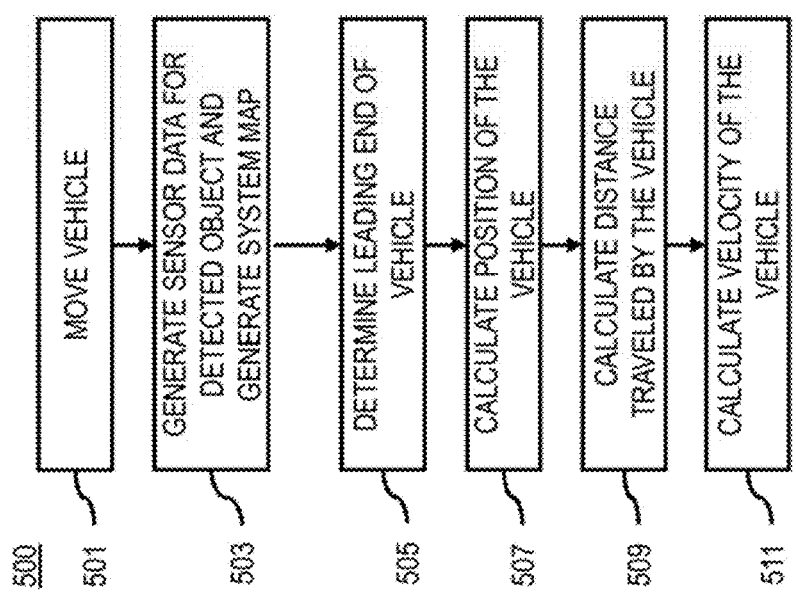
FIG. 5 is a flowchart of a method of generating a system map, determining a position, a distance traveled, and a velocity of a guideway mounted vehicle, in accordance with one or more embodiments.

FIG. 5 is a flowchart of a method 500 of generating a system map, determining a position, a distance traveled, and a velocity of a guideway mounted vehicle, in accordance with one or more embodiments. In some embodiments, one or more steps of method 500 is implemented by a controller such as controller 108 (FIG. 1).

In step 501, the vehicle moves from a start position such as a known or a detected object in one of a first direction or a second direction.

In step 503, one or more sensors generate sensor data based on a detection of an object using a set of sensors on the first end or on the second end of the vehicle. Each sensor of the set of sensors on the first end or the second end of the vehicle is configured to generate corresponding sensor data. In some embodiments, the sensors detect a pattern of objects on a guideway along which the vehicle moves, and the controller recognizes the pattern of objects as the detected object of the plurality of objects based on data stored in a memory comprising information describing the detected object of the plurality of objects. In some embodiments, the controller 108 generates a map of the plurality of objects.

In step 505, the controller compares a time a first sensor detected the object of the plurality of objects with a time a second sensor detected the object of the plurality of objects. Then, based on the time comparison, the controller identifies the first end or the second end as a leading end of the vehicle.

In step 507, the controller calculates a position of the vehicle by calculating one or more of a position of the leading end of the vehicle based on the sensor data generated by one or more of the first sensor or the second sensor, or calculating a position of the end of the vehicle that is other than the leading end of the vehicle based on the position of the leading end of the vehicle and a length of the vehicle.

In step 509, the controller calculates a distance the vehicle traveled from the start position or a detected object. In some embodiments, the controller counts a quantity of objects of the plurality of objects detected by the set of sensors on the first end of the vehicle within a predetermined duration of time, and then calculates the distance the vehicle traveled during the predetermined duration of time based on a total quantity of the detected objects and the distance between each of the equally spaced objects of the plurality of objects.

In step 511, the controller calculates a velocity of the vehicle with respect to the detected object of the plurality of objects based on the distance the vehicle traveled over a predetermined duration of time or a relative velocity of the vehicle with respect to the detected object of the plurality of objects.

Figure 6:
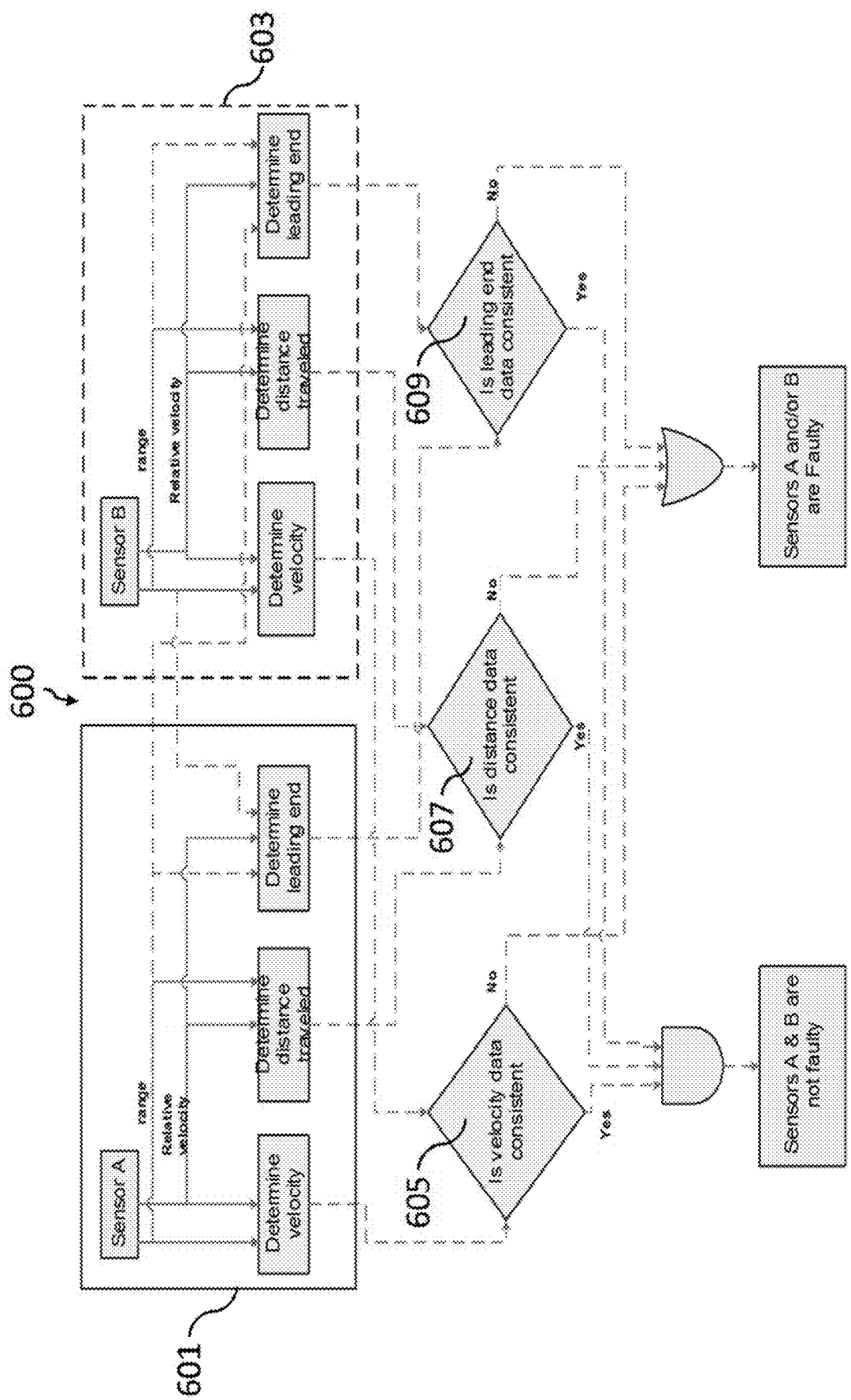
FIG. 6 is a flowchart of a method for checking consistency between the sensors on a same end of the vehicle, in accordance with one or more embodiments.

FIG. 6 is a flowchart of a method 600 for checking consistency between the sensors on a same end of the vehicle, in accordance with one or more embodiments. In some embodiments, one or more steps of method 600 is implemented by a controller such as controller 108 (FIG. 1) and a set of sensors A and B. Sensors A and B are a pair of sensors on a same end of the vehicle such as, the first set of sensors 110 (FIG. 1) or the second set of sensors 112 (FIG. 1).

In step 601, sensor A detects an object such as an object 120 (FIG. 1) and generates sensor data based on the detected object. The sensor data comprises a range (e.g., distance) between sensor A and the detected object and the relative velocity of sensor A with respect to the detected object. Based on the sensor data generated by sensor A, the controller calculates the velocity of the vehicle, calculates the distance the vehicle traveled, and determines the leading end of the vehicle.

In step 603, sensor B detects the object and generates sensor data based on the detected object. The sensor data comprises a range (e.g., distance) between sensor B and the detected object and the relative velocity of sensor B with respect to the detected object. Based on the sensor data generated by sensor B, the controller calculates the velocity of the vehicle, calculates the distance the vehicle traveled, and determines the leading end of the vehicle.

In step 605, the controller compares the velocity of the vehicle that is determined based on the sensor data generated by sensor A with the velocity of the vehicle that is determined based on the sensor data generated by sensor B. In some embodiments, if the values match, then the controller determines sensor A and sensor B are functioning properly. If the values differ by more than a predefined tolerance, then the controller identifies one or more of sensor A or sensor B as being faulty. In some embodiments, if the velocity values match within the predefined threshold, then the controller is configured to use an average of the velocity values as the velocity of the vehicle.

In step 607, the controller compares the distance the vehicle traveled that is determined based on the sensor data generated by sensor A with the distance the vehicle traveled that is determined based on the sensor data generated by sensor B. In some embodiments, if the values match, then the controller determines sensor A and sensor B are functioning properly. If the values differ by more than a predefined tolerance, then the controller identifies one or more of sensor A or sensor B as being faulty. In some embodiments, if the distance values the vehicle traveled match within the predefined threshold, then the controller is configured to use an average of the distance traveled values as the distance the vehicle traveled.

In step 609, the controller compares the leading end of the vehicle that is determined based on the sensor data generated by sensor A with the leading end of the vehicle that is determined based on the sensor data generated by sensor B. In some embodiments, if the values match, then the controller determines sensor A and sensor B are functioning properly. If the values differ by more than a predefined tolerance, then the controller identifies one or more of sensor A or sensor B as being faulty. In some embodiments, the controller determines that sensor A and sensor B are functioning properly (e.g., not faulty) if each of the results of step 605, 607 and 609 are yes.

Figure 7:
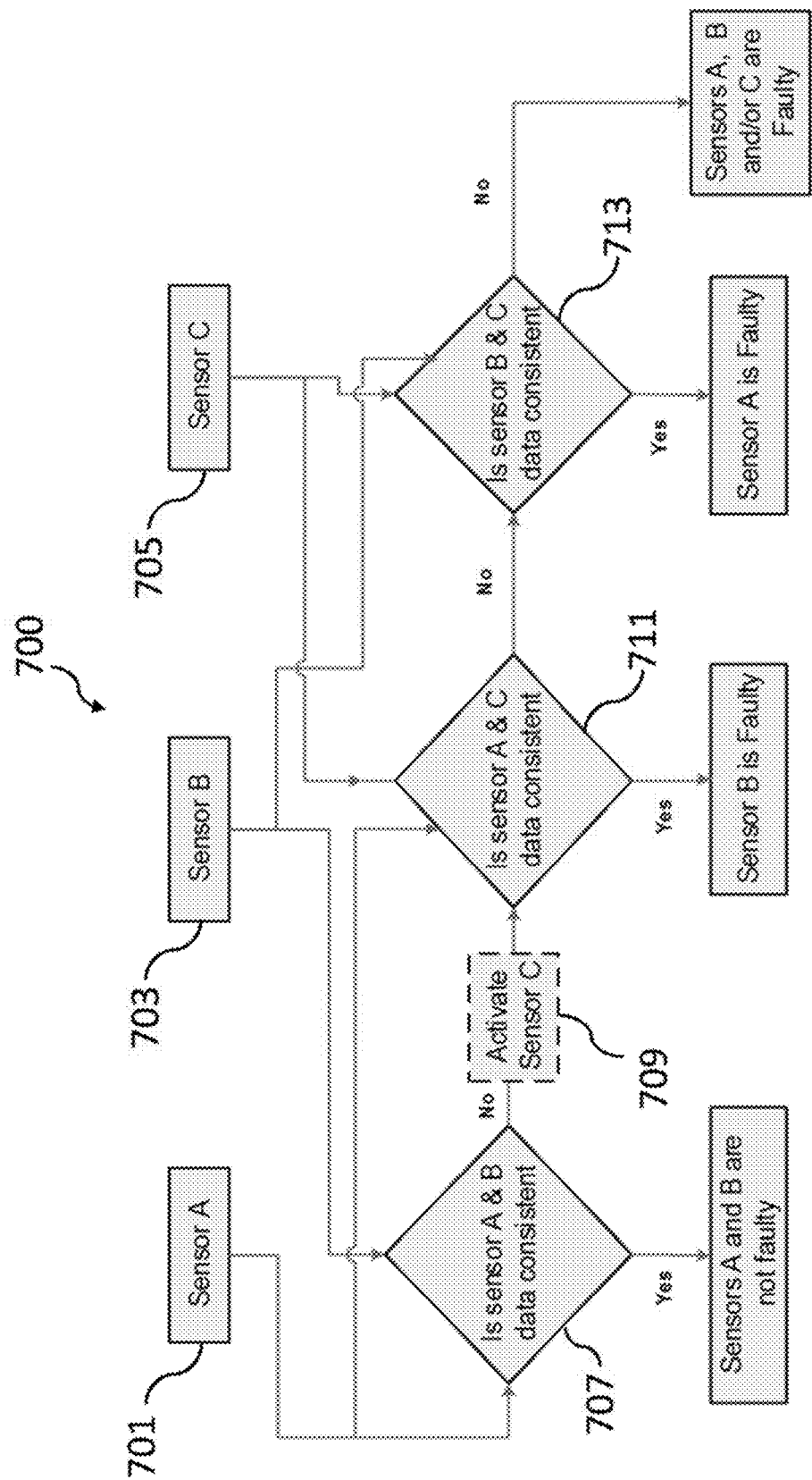
FIG. 7 is a flowchart of a method for checking consistency between the sensors on a same end of the vehicle, in accordance with one or more embodiments.

FIG. 7 is a flowchart of a method 700 for checking consistency between the sensors on a same end of the vehicle, in accordance with one or more embodiments. In some embodiments, one or more steps of method 700 is implemented by a controller such as controller 108 (FIG. 1), a set of sensors A and B, and an auxiliary sensor C. Sensors A and B are a pair of sensors on a same end of the vehicle such as, the first set of sensors 110 (FIG. 1) or the second set of sensors 112 (FIG. 1). Auxiliary sensor C is, for example, a sensor such as first auxiliary sensor 110c (FIG. 1) or second auxiliary sensor 112c. In some embodiments, the sensor data that is compared to identify whether sensor A, sensor B or sensor C is faulty is based on a signature matching comparison, or a comparison of any values that sensor A, sensor B and sensor C are similarly capable of detecting. For ease of discussion, the method 700 is described with respect to a comparison between a range detected by sensor A, sensor B, and sensor C.

In step 701, sensor A detects an object such as an object 120 (FIG. 1) and generates sensor data based on the detected object. The sensor data comprises a range (e.g., distance) between sensor A and the detected object and the relative velocity of sensor A with respect to the detected object. Based on the sensor data generated by sensor A, the controller calculates the velocity of the vehicle, calculates the distance the vehicle traveled, and determines the leading end of the vehicle.

In step 703, sensor B detects the object and generates sensor data based on the detected object. The sensor data comprises a range (e.g., distance) between sensor B and the detected object and the relative velocity of sensor B with respect to the detected object. Based on the sensor data generated by sensor B, the controller calculates the velocity of the vehicle, calculates the distance the vehicle traveled, and determines the leading end of the vehicle.

In step 705, sensor C detects the object and generates sensor data based on the detected object. The sensor data comprises a range (e.g., distance) between sensor C and the detected object and the relative velocity of sensor C with respect to the detected object. Based on the sensor data generated by sensor C, the controller calculates the velocity of the vehicle, calculates the distance the vehicle traveled, and determines the leading end of the vehicle.

In step 707, the controller compares one or more of the sensor data generated by sensor A with the corresponding sensor data generated by sensor B. For example, the controller compares one or more of the velocity of the vehicle that is determined based on the sensor data generated by sensor A with the velocity of the vehicle that is determined based on the sensor data generated by sensor B, the distance the vehicle traveled that is determined based on the sensor data generated by sensor A with the distance the vehicle traveled that is determined based on the sensor data generated by sensor B, or the leading end of the vehicle that is determined based on the sensor data generated by sensor A with the leading end of the vehicle that is determined based on the sensor data generated by sensor B. If the values match, then the controller determines sensor A and sensor B are functioning properly (e.g., not faulty). If the values differ by more than a predefined tolerance, then the controller identifies one or more of sensor A or sensor B as being faulty.

In step 709, the controller activates sensor C. In some embodiments, step 709 is executed prior to one or more of steps 701, 703, 705 or 707.

In step 711, the controller compares one or more of the sensor data generated by sensor A with the corresponding sensor data generated by sensor C. For example, the controller compares one or more of the velocity of the vehicle that is determined based on the sensor data generated by sensor A with the velocity of the vehicle that is determined based on the sensor data generated by sensor C, the distance the vehicle traveled that is determined based on the sensor data generated by sensor A with the distance the vehicle traveled that is determined based on the sensor data generated by sensor C, or the leading end of the vehicle that is determined based on the sensor data generated by sensor A with the leading end of the vehicle that is determined based on the sensor data generated by sensor C. If the values match, then the controller determines sensor A and sensor C are functioning properly (e.g., not faulty), and the controller identifies sensor B as being faulty. If the values differ by more than the predefined tolerance, then the controller identifies one or more of sensor A or sensor C as being faulty.

In step 713, the controller compares one or more of the sensor data generated by sensor B with the sensor data generated by sensor C. For example, the controller compares one or more of the velocity of the vehicle that is determined based on the sensor data generated by sensor B with the velocity of the vehicle that is determined based on the sensor data generated by sensor C, the distance the vehicle traveled that is determined based on the sensor data generated by sensor B with the distance the vehicle traveled that is determined based on the sensor data generated by sensor C, or the leading end of the vehicle that is determined based on the sensor data generated by sensor B with the leading end of the vehicle that is determined based on the sensor data generated by sensor C. If the values match, then the controller determines sensor B and sensor C are functioning properly (e.g., not faulty), and the controller identifies sensor A as being faulty. If the values differ by more than the predefined tolerance, then the controller identifies two or more of sensor A, sensor B or sensor C as being faulty.

Figure 8:
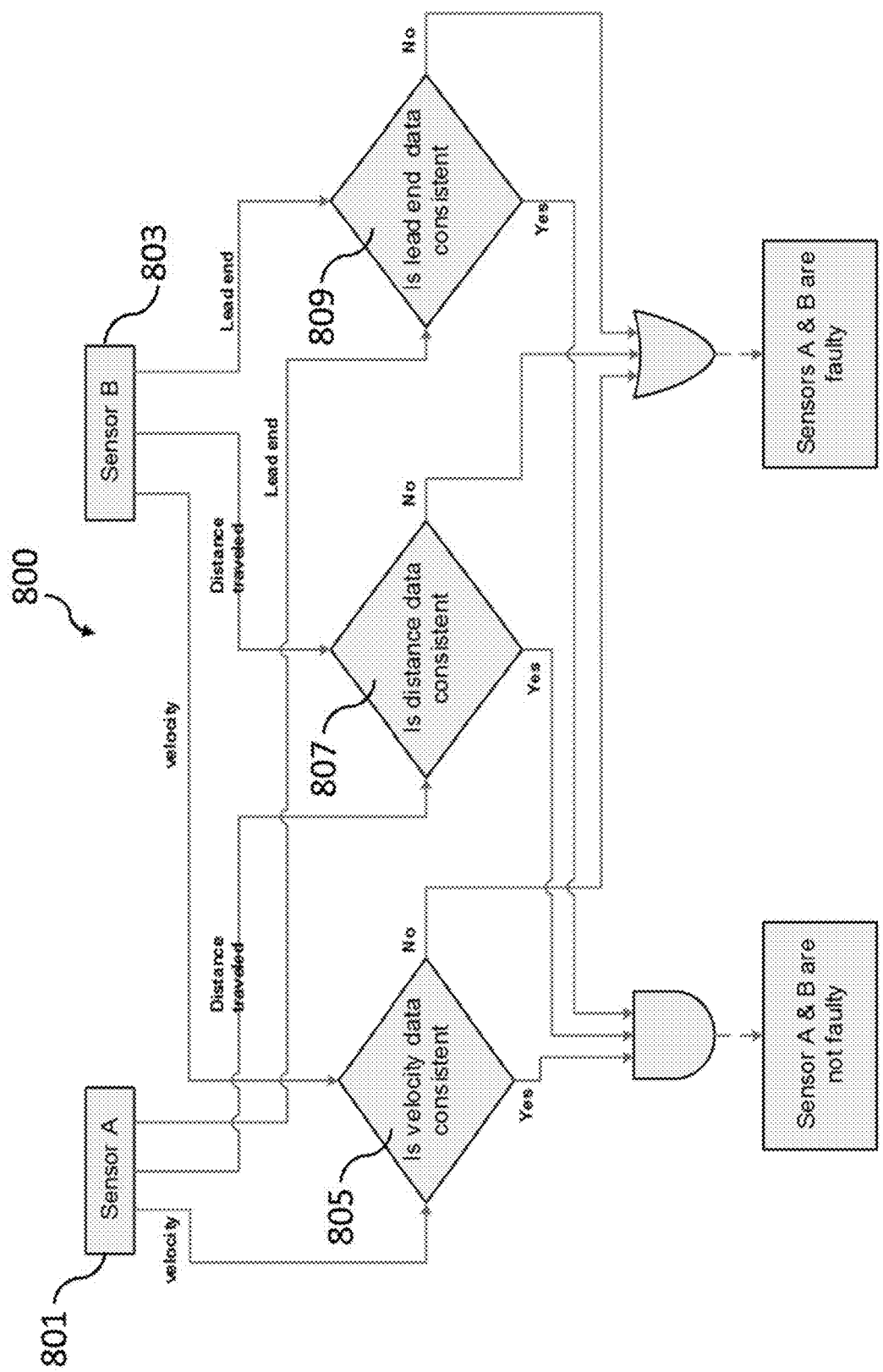
FIG. 8 is a flowchart of a method for checking consistency between the sensors on opposite ends of the vehicle, in accordance with one or more embodiments.

FIG. 8 is a flowchart of a method 800 for checking consistency between sensors on opposite ends of the vehicle, in accordance with one or more embodiments. In some embodiments, one or more steps of method 800 is implemented by a controller such as controller 108 (FIG. 1) and sensors A and B. Sensors A is, for example, a sensor such as first sensor 110a (FIG. 1). Sensor B is, for example, a sensor such as third sensor 112a (FIG. 1).

In step 801, sensor A detects an object such as an object 120 (FIG. 1) and generates sensor data based on the detected object. The sensor data comprises a range (e.g., distance) between sensor A and the detected object and the relative velocity of sensor A with respect to the detected object. Based on the sensor data generated by sensor A, the controller calculates the velocity of the vehicle, calculates the distance the vehicle traveled, and determines the leading end of the vehicle.

In step 803, sensor B, on the opposite end of the vehicle, detects the object and generates sensor data based on the detected object. The sensor data comprises a range (e.g., distance) between sensor B and the detected object and the relative velocity of sensor B with respect to the detected object. Based on the sensor data generated by sensor B, the controller calculates the velocity of the vehicle, calculates the distance the vehicle traveled, and determines the leading end of the vehicle.

In step 805, the controller compares the velocity of the vehicle that is determined based on the sensor data generated by sensor A with the velocity of the vehicle that is determined based on the sensor data generated by sensor B. In some embodiments, if the magnitudes match, then the controller determines sensor A and sensor B are functioning properly (e.g., not faulty). If the magnitudes differ by more than a predefined tolerance, then the controller identifies one or more of sensor A or sensor B as being faulty. The controller is configured to compare the magnitudes of the velocities determined based on the sensor data generated by sensor A and sensor B because the sensor on the leading end of the vehicle will generate sensor data that results in a negative velocity as the vehicle approaches the detected object, and the sensor on the non-leading end of the vehicle will generate sensor data that results in a positive velocity as the vehicle departs from the detected object. In some embodiments, if the velocity values match within the predefined threshold, then the controller is configured to use an average of the velocity values as the velocity of the vehicle.

In step 807, the controller compares the distance the vehicle traveled that is determined based on the sensor data generated by sensor A with the distance the vehicle traveled that is determined based on the sensor data generated by sensor B. In some embodiments, if the values match, then the controller determines sensor A and sensor B are functioning properly (e.g., not faulty). If the values differ by more than a predefined tolerance, then the controller identifies one or more of sensor A or sensor B as being faulty. In some embodiments, if the distance the vehicle traveled values match within the predefined threshold, then the controller is configured to use an average of the distance traveled values as the distance the vehicle traveled.

In step 809, the controller compares the leading end of the vehicle that is determined based on the sensor data generated by sensor A with the leading end of the vehicle that is determined based on the sensor data generated by sensor B. In some embodiments, if the values match, then the controller determines sensor A and sensor B are functioning properly (e.g., not faulty). If the values differ by more than a predefined tolerance, then the controller identifies one or more of sensor A or sensor B as being faulty. In some embodiments, the controller determines that sensor A and sensor B are functioning properly (e.g., not faulty) if each of the results of step 805, 807 and 809 are yes.

Figure 9:
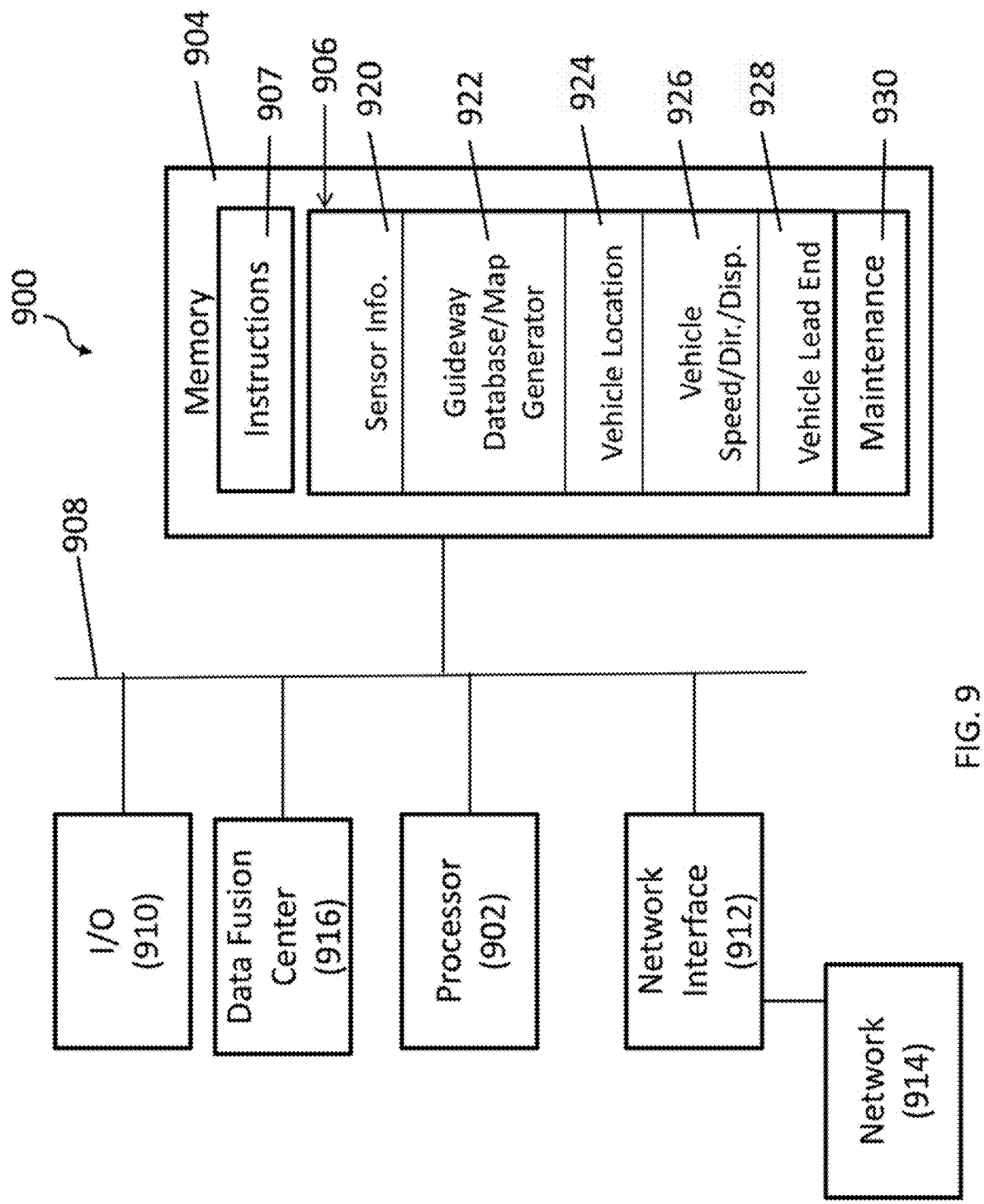
FIG. 9 is a block diagram of a vehicle on board controller ("VOBC"), in accordance with one or more embodiments.

FIG. 9 is a block diagram of a vehicle on board controller ("VOBC") 900, in accordance with one or more embodiments.

VOBC 900 is usable in place of one or more of controller 108 (FIG. 1) or data fusion center 230 (FIG. 2), alone or in combination with memory 109 (FIG. 1). VOBC 900 includes a specific-purpose hardware processor 902 and a non-transitory, computer readable storage medium 904 encoded with, i.e., storing, the computer program code 906, i.e., a set of executable instructions. Computer readable storage medium 904 is also encoded with instructions 907 for interfacing with manufacturing machines for producing the memory array. The processor 902 is electrically coupled to the computer readable storage medium 904 via a bus 908. The processor 902 is also electrically coupled to an I/O interface 910 by bus 908. A network interface 912 is also electrically connected to the processor 902 via bus 908. Network interface 912 is connected to a network 914, so that processor 902 and computer readable storage medium 904 are capable of connecting to external elements via network 914. VOBC 900 further includes data fusion center 916. The processor 902 is connected to data fusion center 916 via bus 908. The processor 902 is configured to execute the computer program code 906 encoded in the computer readable storage medium 904 in order to cause system 900 to be usable for performing a portion or all of the operations as described in method 500, 600, 700, or 800.

In some embodiments, the processor 902 is a central processing unit (CPU), a multi-processor, a distributed processing system, an application specific integrated circuit (ASIC), and/or a suitable processing unit.

In some embodiments, the computer readable storage medium 904 is an electronic, magnetic, optical, electromagnetic, infrared, and/or a semiconductor system (or apparatus or device). For example, the computer readable storage medium 904 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 904 includes a compact disk-read only memory (CD-ROM), a compact disk-read/write (CD-R/W), and/or a digital video disc (DVD).

In some embodiments, the storage medium 904 stores the computer program code 906 configured to cause system 900 to perform method 500, 600, 700 or 800. In some embodiments, the storage medium 904 also stores information needed for performing method 500, 600, 700 or 800 as well as information generated during performing the method 500, 600, 700 or 800 such as a sensor information parameter 920, a guideway database and map generator parameter 922, a vehicle location parameter 924, a vehicle speed/direction/displacement parameter 926, a vehicle leading end parameter 928, a maintenance monitoring parameter 930 and/or a set of executable instructions to perform the operation of method 500, 600, 700 or 800.

In some embodiments, the storage medium 904 stores instructions 907 to effectively implement method 500, 600, 700 or 800.

VOBC 900 includes I/O interface 910. I/O interface 910 is coupled to external circuitry. In some embodiments, I/O interface 910 includes a keyboard, keypad, mouse, trackball, trackpad, and/or cursor direction keys for communicating information and commands to processor 902.

VOBC 900 also includes network interface 912 coupled to the processor 902. Network interface 912 allows VOBC 900 to communicate with network 914, to which one or more other computer systems are connected. Network interface 912 includes wireless network interfaces such as BLUETOOTH, WIFI, WIMAX, GPRS, or WCDMA; or wired network interface such as ETHERNET, USB, or IEEE-1394. In some embodiments, method 500, 600, 700 or 800 is implemented in two or more VOBCs 900, and information such as memory type, memory array layout, I/O voltage, I/O pin location and charge pump are exchanged between different VOBCs 900 via network 914.

VOBC further includes data fusion center 916. Data fusion center 916 is similar to data fusion center 230 (FIG. 2). In the embodiment of VOBC 900, data fusion center 916 is integrated with VOBC 900. In some embodiments, the data fusion center is separate from VOBC 900 and connects to the VOBC 900 through I/O interface 910 or network interface 912.

VOBC 900 is configured to receive sensor information related to a fusion sensor arrangement, e.g., fusion sensor arrangement 200 (FIG. 2), through data fusion center 916. The information is stored in computer readable medium 904 as sensor information parameter 920. VOBC 900 is configured to receive information related to the guideway database through I/O interface 910 or network interface 912. The information is stored in computer readable medium 904 as guideway database and map generator parameter 922.

VOBC 900 is configured to receive information related to vehicle location through I/O interface 910, network interface 912 or data fusion center 916. The information is stored in computer readable medium 904 as vehicle location parameter 924. VOBC 900 is configured to receive information related to vehicle speed through I/O interface 910, network interface 912 or data fusion center 916. The information is stored in computer readable medium 904 as vehicle speed/direction/displacement parameter 926.

During operation, processor 902 executes a set of instructions to determine the location and speed of the guideway mounted vehicle, which are used to update vehicle location parameter 924 and vehicle speed/direction/displacement parameter 926. Processor 902 is further configured to receive LMA instructions and speed instructions from a centralized or de-centralized control system. Processor 902 determines whether the received instructions are in conflict with the sensor information. Processor 902 is configured to generate instructions for controlling an acceleration and braking system of the guideway mounted vehicle to control travel along the guideway.

An aspect of this description relates to a system comprising a set of sensors on a first end of a vehicle having the first end and a second end, and a controller coupled with the set of sensors. The sensors of the set of sensors are each configured to generate corresponding sensor data based on a detected object of a plurality of objects along a direction of movement of the vehicle. The controller is configured to compare a time the first sensor detected the object of the plurality of objects with a time the second sensor detected the object of the plurality of objects. The controller is also configured to identify the first end or the second end as a leading end of the vehicle based on the comparison of the time the first sensor detected the object of the plurality of objects with the time the second sensor detected the object of the plurality of objects. The controller is further configured to calculate a position of the leading end of the vehicle based on the sensor data generated by one or more of the first sensor or the second sensor. The controller is further configured to generate a map of the plurality of objects based on the sensor data.

Another aspect of this description relates to a method comprising generating sensor data based on a detection of an object of a plurality objects along a direction of movement of a vehicle having a first end and a second end using a set of sensors on the first end of the vehicle. Each sensor of the set of sensors on the first end of the vehicle is configured to generate corresponding sensor data. The method also comprises comparing a time the first sensor detected the object of the plurality of objects with a time the second sensor detected the object of the plurality of objects. The method further comprises identifying the first end or the second end as a leading end of the vehicle based on the comparison of the time the first sensor detected the object of the plurality of objects with the time the second sensor detected the object of the plurality of objects. The method additionally comprises calculating a position of the leading end of the vehicle based on the sensor data generated by one or more of the first sensor or the second sensor. The method further comprises generating a map of the plurality of objects based on the sensor data.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A system, comprising:
a set of sensors on a first end of a vehicle having the first end and a second end, each sensor of the set of sensors on the first end being configured to generate corresponding sensor data based on detection of one or more objects of a plurality of objects along a direction of movement of the vehicle; and
a controller coupled with the set of sensors, the controller being configured to:
compare a time at which a first sensor of the set of sensors on the first end detected a first object with a time at which a second sensor of the set of sensors on the first end detected the first object;
identify the first end or the second end as a leading end of the vehicle based on the comparison of the time the first sensor detected the first object with the time the second sensor detected the first object;
calculate a position of the leading end of the vehicle based on sensor data generated by one or more of the first sensor or the second sensor; and
generate a map of the plurality of objects based on the sensor data.

2. The system of claim 1, further comprising:
a geographic position sensor configured to identify a position of the vehicle based on the detection of the first object,
wherein the controller is configured to determine a geographic position of the first object based on the position of the leading end of the vehicle and the position of the vehicle identified by the geographic position sensor.

3. The system of claim 2, wherein the controller is further configured to generate the map of the plurality of objects corresponding to geographic positions of the plurality of objects based on the position of the vehicle identified by the geographic position sensor and the position of the vehicle identified by the geographic position sensor when each object of the plurality of objects is detected.

4. The system of claim 2, wherein the controller is further configured to identify the first object based on the sensor data.

5. The system of claim 1, wherein the position of the leading end of the vehicle is calculated based on a distance between a detected second object and the first object.

6. The system of claim 1, wherein consecutive objects of the plurality of objects are pairs of objects separated by a distance stored in a memory, and the controller is further configured to:
count a quantity of objects detected by the set of sensors during a predetermined duration of time;
search the memory for the distance stored between each pair of consecutive objects detected by the set of sensors during the predetermined duration of time; and
add the distances between each pair of consecutive objects for the quantity of objects detected by the set of sensors to determine a distance the vehicle traveled during the predetermined duration of time.

7. The system of claim 6, wherein the controller is further configured to calculate a velocity of the vehicle based on the distance the vehicle traveled and the predetermined duration of time.

8. The system of claim 1, wherein
one or more objects of the plurality of objects are a pattern of objects,
each sensor of the set of sensors are configured to recognize the one or more objects based on the pattern of objects.

9. The system of claim 1, wherein the vehicle is configured to move along a guideway, and one or more objects of the plurality of objects is on the guideway.

10. The system of claim 1, wherein the vehicle is configured to move along a guideway, and one or more objects of the plurality of objects is on a wayside of the guideway.

11. The system of claim 1, wherein the controller is further configured to:
compare a first calculated value based on the sensor data generated by the first sensor with a second calculated value based on the sensor data generated by the second sensor,
identify one of the first sensor or the second sensor as being faulty based on a determination that the first calculated value differs from the second calculated value by more than a predefined threshold, and
initiate a maintenance procedure to identify a source of a difference between the first calculated value and the second calculated value.

12. The system of claim 11, wherein each of the first calculated value and the second calculated value is the identification of the leading end of the vehicle, the position of the leading end of the vehicle, a signature based on the sensor data indicative of a property associated with the first object, a distance the vehicle traveled, or a velocity of the vehicle.

13. The system of claim 1, further comprising:
a third and fourth sensor, where the third and fourth sensor correspond to a set of sensors on the second end of the vehicle, each sensor on the second end of the vehicle being configured to generate corresponding sensor data based on the first object,
wherein the controller is further configured to:
compare a time the third sensor detected the first object with a time the fourth sensor detected the first object;
identify the first end or the second end as the leading end of the vehicle based on the comparison of the time the third sensor detected the first object with the time the fourth sensor detected the first object; and
calculate the position of the leading end of the vehicle based on the sensor data generated by one or more of the third sensor or the fourth sensor.

14. The system of claim 13, wherein
the controller is further configured to:
compare a first calculated value based on the sensor data generated by one or more of the first sensor or the second sensor with a second calculated value based on the sensor data generated by one or more of the third sensor or the fourth sensor; and
identify one of the first sensor, the second sensor, the third sensor, or the fourth sensor as being faulty based on a determination that the first calculated value differs from the second calculated value by more than a predefined threshold.

15. The system of claim 14, wherein each of the first calculated value and the second calculated value is the identification of the leading end of the vehicle, the position of the leading end of the vehicle, a signature based on the sensor data indicative of a property associated with the first object, a distance the vehicle traveled, or a velocity of the vehicle.

16. The system of claim 13, wherein the controller is further configured to:

calculate a first velocity of the leading end of the vehicle based on the sensor data generated by the set of sensors on an end of the vehicle identified as being the leading end of the vehicle;

calculate a second velocity of other of the first end or the second end that is other than the leading end of the vehicle based on the sensor data generated by the set of sensors on an end of the vehicle that is other than the leading end of the vehicle; and generate an alarm based on a determination that a magnitude of the first velocity differs from a magnitude of the second velocity by more than a predefined threshold.

17. The system of claim 1, wherein each sensor in the set of sensors on the first end of the vehicle are laser imaging detection and ranging ("LIDAR") sensors.

18. A method, comprising:

generating sensor data based on a detection of an object of a plurality of objects along a direction of movement of a vehicle having a first end and a second end using a first sensor and a second sensor of a set of sensors on the first end of the vehicle, wherein each sensor of the set of sensors on the first end of the vehicle is configured to generate corresponding sensor data;

comparing a time that the first sensor detected the object with a time that the second sensor detected the object;

identifying the first end or the second end as a leading end of the vehicle based on the comparison of the time that the first sensor detected the object with the time that the second sensor detected the object;

calculating a position of the leading end of the vehicle based on the sensor data generated by one or more of the first sensor or the second sensor; and generating a map of the plurality of objects based on the sensor data.

19. The method of claim 18, further comprising:

generating geographic position data identifying a position of the vehicle based on the detection of the object; and identifying a geographic position of the object based on the position of the leading end of the vehicle and the position of the vehicle based on the geographic position data.

20. The method of claim 18, wherein the map of the plurality of objects includes information representative of geographic positions of the plurality of objects based on the position of the vehicle identified by a geographic position sensor and the position of the vehicle identified by the geographic position sensor when each of the plurality of objects is detected.

* * * * *